United States Patent [19]
Koenig et al.

[11] Patent Number: 6,101,198
[45] Date of Patent: Aug. 8, 2000

[54] PROCESSOR-BASED VOICE AND DATA TIME SLOT INTERCHANGE SYSTEM

[75] Inventors: Roger L. Koenig, Boulder; Tim P. Groth, Lakewood; Matthew D. Morris, Boulder; James Michael Dougherty, Highlands Ranch; Gordon K. Francis, Louisville, all of Colo.

[73] Assignee: Carrier Access Corporation, Boulder, Colo.

[21] Appl. No.: 08/760,103

[22] Filed: Dec. 3, 1996

[51] Int. Cl.[7] ................................. H04J 3/02; H04J 3/22; H04J 3/04
[52] U.S. Cl. ...................... 370/535; 370/537; 370/538; 370/544
[58] Field of Search .................................. 370/535, 371, 370/370, 359, 464, 498, 351, 357, 360, 369, 376, 375, 378, 537, 538, 540, 542, 543, 544, 916

[56] References Cited

U.S. PATENT DOCUMENTS

| | | | |
|---|---|---|---|
| 4,005,272 | 1/1977 | Collins et al. | 370/371 X |
| 4,071,703 | 1/1978 | Schaffter | 370/370 |
| 4,154,986 | 5/1979 | Howells et al. | 370/376 |
| 4,228,536 | 10/1980 | Gueldenpfennig et al. | 370/66 |
| 4,644,535 | 2/1987 | Johnson et al. | 370/376 |
| 4,771,420 | 9/1988 | Deschaine et al. | 370/376 |
| 4,805,172 | 2/1989 | Barbe et al. | 370/68.1 |

(List continued on next page.)

OTHER PUBLICATIONS

"Alliance Generation™ AG–T1 Board." No month/year.
"Plexus™ Digital Telephone System," BBS Telecom. No month/year.
"TX2000 Dual T1/E1/ISDN PRI Daughter Card," TEKnique. No month/year.
"Series 8500 Digital Crossconnect Switch," Paragon Networks International, Inc., 1995. No month.
"CMOS ST–BUS™ Family MT90820 Large Digital Switch, Preliminary Information," Mitel Corporation 1996. No month.
"ISO–CMOS ST–BUS™ Family MT8980D Digital Switch," Mitel Corporation, May 1995, Issue 6, pp. 2-3-2-15.
"CMOS MT90810 Flexible MVIP Interface Circuit, Preliminary Information," Mitel Corporation, Oct. 1994, Issue 2, pp. 2–145-2–177.
"Applications; Application Note MSAN–123, The MT8980 and the MT8981 Digital Crosspoint Switches," Mitel Corporation, Jun. 1986, Issue 1, pp. A–109–A118.
"Applications; Application Note MSAN–129, Time Space Switching 8,16 or 32 kbps Channels using the MT8980," Mitel Corporation, Apr. 1987, Issue 1, pp. A–149–A–152.

(List continued on next page.)

*Primary Examiner*—Huy D. Vu
*Assistant Examiner*—Man Phan
*Attorney, Agent, or Firm*—Robert G. Crouch; Holland & Hart LLP

[57] ABSTRACT

A technique for performing a time slot interchange in a processor. The TSI process is surrounded by a multiplexing/demultiplexing circuit for converting a plurality of PCM highways into a single input serial data stream. The mux/demux circuit includes elastic stores to align frames and shift resisters to mux/demux with a minimum of delay. The TSI processor includes an input and an output buffered serial port, a pair of input buffers, one to receive even-numbered frames from the PCM highways and one to receive odd-numbered frames, and an output buffer. Data is read from the appropriate input buffer in a non-sequential fashion as commanded by the processor in accordance with information stored in connection arrays (address buffers). The data is then written to the output buffer sequentially. The timing of the reading and writing steps is optimized relative to free running buffered serial port pointers for each BSP to reduce the frame delay.

14 Claims, 18 Drawing Sheets

U.S. PATENT DOCUMENTS

| | | | |
|---|---|---|---|
| 4,941,141 | 7/1990 | Hayano | 370/376 |
| 5,226,042 | 7/1993 | Ardon et al. | 370/376 |
| 5,257,260 | 10/1993 | Breidenstein et al. | 370/376 |
| 5,282,195 | 1/1994 | Hood et al. | 370/58.1 |
| 5,331,632 | 7/1994 | Aaron et al. | 370/68 |
| 5,335,228 | 8/1994 | Bottiglieri et al. | 370/100.1 |
| 5,341,473 | 8/1994 | Takayama | 395/200 |
| 5,408,467 | 4/1995 | Clougherty et al. | 370/58.1 |
| 5,412,657 | 5/1995 | Bottiglieri et al. | 370/66 |
| 5,521,919 | 5/1996 | Anderson et al. | 370/68 |
| 5,521,920 | 5/1996 | Nagase | 370/376 |
| 5,521,928 | 5/1996 | Worsley et al. | 370/67 |
| 5,583,855 | 12/1996 | Ball | 370/376 |

OTHER PUBLICATIONS

"Applications; Application Note MSAN–148 An Introduction to MVIP™ and Details on Implementation using the MT90810," Mitel Corporation, Sep. 1994, Issue 1, pp. A–269–A–282.

"Getting Started With MVIP Switching; MVIP Hardware," Natural MicroSystems, pp. 21–22 No month/year.

"TX1000 High Performance Communication Processor," TEKnique, Inc. (1995). No month.

"Single AG–T1 Board Technical Specifications," Natural MicroSystems. No month/year.

"Digital Telephony," John Bellamy, *Time Division Switching*, John Wiley & Sons, Inc. (1991). pp. 250–252 No month.

LEGEND:
N = NULL
F = Framing Bit

PROCESSOR-BASED VOICE AND DATA TIME SLOT INTERCHANGE SYSTEM

The present invention relates to telecommunications equipment for connecting communication highways together, and in particular, to a system which links digitized voice, data, and video transmission lines to other voice, data, or video transmission lines or to any digitally multiplexed carrier or transmission system, such as T-1, T-2, T-3, or T-4 channels.

BACKGROUND OF THE INVENTION

The majority of the world's telecommunications networks rely on proven digital communication technologies based on Time Division Multiplexing (TDM) and Pulse Code Modulation (PCM). Time Division Multiplexing is able to carry multiple data and digitized voice (normally PCM) channels over a variety of physical transmission media. Examples of such media are copper wire, optical fiber, and radio. Various TDM data speeds are used in communications, depending on the capabilities of the physical media or carrier. For example, the T-1 standard multiplexes twenty-four communications channels to make economical use of lower speed media (e.g. copper wires), while the T-3 standard multiplexes 672 communications channels for use on higher speed media (e.g. optical fiber).

TDM combines data samples from several different communications channels (for example, telephone calls) into a single aggregate synchronous bit pattern at a higher data speed. By so doing, several communications channels may economically share the same communications medium, whether it be a pair of copper wires, a strand of optical fiber, or a modulated radio frequency. Thus, TDM reduces the number of physical transmission resources needed in comparison to the alternative of dedicating a separate physical medium for each communications channel. For example, T-1 uses two copper wire pairs to carry twenty-four telephone channels, instead of using twenty-four individual copper wire pairs.

In addition to economical media use, digital Pulse Code Modulation and Time Division Multiplexing also provide very high-quality voice transmission over long distances. Analog modulations (for example, the output of a telephone set) are subject to reductions in volume level, frequency distortion, and injection of noise signals as the distance of transmission increases. Because TDM is a digital technique, the communications channels may be faithfully recreated (decoded) at their destination point, regardless of the distance traveled.

Because all TDM communications channels are encoded as digital data, TDM also lends itself to the digital switching of channels to multiple destinations (for example, telephone call routing). In summary, TDM provides economical media utilization, quality of voice transmission, ease of channel routing or switching, and the ability to carry a variety of voice and data traffic types over a common communications network. Because of economy and quality, TDM techniques provide the majority of the world's communications infrastructure and continue to grow daily in implementation.

An example of Time Division Multiplexing for the creation of a T-1 carrier aggregate output is shown in FIG. 1. In the T-1 Multiplexing example, each of the eight-bit digital data or voice samples has an effective data rate of 64 kilo bits per second. This data rate is derived from the international standard of eight-bit Pulse Code Modulation that samples voice at a rate of 8 kilo Hertz. Eight bits times 8 kilo Hertz results in 64 kilo bits per second of information at each of twenty-four input communications channels. The T-1 Time Division Multiplexer device creates a higher bit rate aggregate output from the twenty-four input channels. The data rate of the aggregate output is twenty-four channels times 64 kilo bits each of 1.536 kilo bits per second. The insertion of the Frame Bit by the T-1 Multiplexer accounts for an extra 8 kilo bits per second, to make the total transmission rate of T-1 aggregate 1,544 kilo bits per second. The Frame Bit allows the far-end T-1 demultiplexer to recognize the beginning order of the communications channels, and decode them in the proper sequence.

By placing each channel's data in a time-sequenced order on the line, it is easy for the far-end receiving demultiplexer to recreate the channels faithfully in the correct order. Time sequencing and synchronization of data speeds from end-to-end are fundamental properties of Time Division Multiplexing.

A basic need of most communications networks is the ability to mix communications channels from different TDM sources. FIG. 2 shows a technique called T-1 Drop and Insert Grooming, which is performed by many T-1 multiplexing devices available on the commercial market. Twenty-four communications channels are transmitted from Location X to Location Y over a T-1 carrier. Channels 13 through 24 that are used for communications between X and Y are groomed from the T-1 carrier at Location Y, where they would typically be decoded as twelve voice or data channels. The remainder of Location X's transmitted T-1 channels (1 through 12) are sent on by Location Y to Location Z. The channels marked by an X in the diagram are unusable (idle coded) channels in the T-1 carrier frame. Location X can communicate with Location Y via channels 13 through 24. Location X can communicate with Location Z via channels 1 through 12. Location Y cannot communicate with Location Z. This is a fundamental limitation of the utility of T-1 Drop and Insert Grooming.

A technique of combining channels from two (or many) TDM sources at Location Y is shown in FIG. 3. This technique of Time and Space Switching may include Time Slot Interchange (TSI), and forms the basis for both Digital Cross Connection and Switching (or call routing) devices. The Time and Space Switch can be configured to provide the less complex function of T-1 Drop and Insert Grooming, as previously explained. In addition to this function, it provides capabilities that address a much wider range of communications needs.

In the example shown in FIG. 3, channels that originate from the Location X T-1 carrier may be assigned by the Time and Space Switch for communications with Location Y. This is shown in this example as Data C in time slot 24 of the X T-1 being output in time slot 3 of the Y T-1.

Unlike the T-1 Drop and Insert Grooming example shown in FIG. 2, Location Y may communicate with Location Z through channels assigned by the Time and Space Switch at Location Y. An example is Data B in time slot 22 of the Y T-1 being output in time slot 1 of the Z T-1.

Location X may also be assigned to communicate with Location Z. An example is Data A in time slot 3 of the X T-1 being output in time slot 23 of the Z T-1.

Thus with a Time and Space Switch at Location Y, any of the three locations can be assigned communications channels with any other location. There are no restrictions, as with the Drop and Insert Grooming technique. By adding more T-1 connections to the Time and Space switch, more Locations can be added to the communications hub at Location Y.

The Drop and Insert Grooming technique fixes the time slot sequence of output channels to the same time position as the input channels. Channel 4 data from Location X will only appear in the Channel 4 position at Location Z, for example, regardless of particular channel assignment needs at the Z location.

With the Time and Space Switch replacing the Drop and Insert technique, Channel 4 data from Location X may be freely assigned to appear in any desired channel at location Z. Flexible assignment of channels provides users with more effective utilization of equipment and more easily managed resources at all locations.

A Digital Cross Connect function assigns channels between T-1 connections statically. The channel assignments do not typically change once they are programmed in the Time and Space Switch. In contrast, the Switching function makes use of the Time and Space Switch to dynamically change channel assignments on a call-by-call basis. Originating T-1 channels are connected to destination T-1 channels as telephone or data calls are routed between locations by the Switch. When a call is released, the channels are disconnected in the Time and Space Switch and made available for another call. Time and Space Switching is a fundamental function of large-scale transmission resource management devices (Digital Cross Connect Systems) and Digital Telecommunications Switches in the public communications network, world-wide.

Of course, there are already many network access devices based on TDM and PCM, including hardware implementations such as conventional single T-1 digital channel banks and broadband T-1 access multiplexers. But such equipment is generally large, expensive, and relatively inflexible in its functionality.

Complex hardware designs including TSI circuitry suffer from the disadvantages of an undesirable amount of circuit board "real estate" being used as well as an undesirable amount of power consumption. Perhaps even more important is the amount of frame delay inherent in most TSI implementations, with delays in the range of two to three frames. In addition, most hardware TSI designs are inherently inflexible in their application and potential for modification, as well as upward scalability.

It is against this background and the desire to solve the problems of the prior art that the present invention has been developed.

SUMMARY OF THE INVENTION

Accordingly, it is an object of the present invention to provide an improved telecommunication device for linking communication highways.

It is also an object of the present invention to provide an improved telecommunication device for linking communication highways which is smaller and less expensive than currently available devices.

It is further an object of the present invention to provide an improved telecommunication device for linking communication highways which is adaptable and flexible so as to be configured for increased functionality and performance.

It is still further an object of the present invention to provide a technique for performing time slot interchange which dramatically reduces the frame delay.

It is still further an object of the present invention to provide:

A V.35 data interface to greatly increase product applications, including Internet and router access;

Dual T-1 interfaces providing up to 3.072 Mbps of available bandwidth for Drop and Insert (D&I) or Digital Access & Cross Connection (DACS) or other switching functions;

Termination for up to 24 voice channels plus a V.35 data channel for PBX T-1 attachments;

Automatic Protection Switching of T-1 lines, without separate equipment or maintenance interfaces;

Additional data capabilities and on-board processing power necessary for in-band, out-of-band, or RS-232 management; and Facilities Data Link (FDL) Performance Report Messages and end-to-end out-of-band management on ESF T-1 connections.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a method for performing a time slot interchange in a processor with a minimum of frame delay. The method includes the steps of: accepting an input serial data stream through a serial port in the processor; buffering the input serial data stream in an input buffer in the processor; transferring data from the input buffer to an output buffer in the processor in a fashion which remaps the data in the input buffer into data in the output buffer to perform a time slot interchange; and providing an output serial data stream from the output buffer through a serial port in the processor.

Further, there may be two input buffers. The digital data on the input and output serial data streams may be grouped into frames of data, and the two input buffers may include one for buffering the odd-numbered frames and one for buffering the even-numbered frames. The two input buffers may be located in one contiguous section of memory. Data may be written to the input buffer sequentially, read from the input buffer non-sequentially, written to the output buffer sequentially, and read from the output buffer sequentially. The output buffer may be a circular buffer to allow the writing to the output buffer to be performed in a continuous fashion, automatically wrapping around from the last location in the output buffer to the first location in the output buffer. Alternatively, data may be written to the input buffer sequentially, read from the input buffer sequentially, written to the output buffer non-sequentially, and read from the output buffer sequentially.

The processor may be a digital signal processor. The input serial data stream and the output serial data stream may be forced to be in phase with one another. The digital data on the input and output serial data streams may be grouped into frames of data, and the performance of the time slot interchange may cause a delay of less than two frames.

The time slot interchange may be used to link multiple digital telecommunication highways which each transport channels of digital data, which channels can include voice channels, data channels, or video channels, or any combination thereof. In which case, the method further includes the steps of: multiplexing the digital data from each of the telecommunication highways into the input serial data stream which is of a higher rate than the serial data streams of the telecommunication highways; and demultiplexing the data from the output serial data stream into serial data streams for each of the telecommunication highways. Also, the output serial data stream is of a higher rate than the serial data streams of the telecommunication highways. The digital data on each of the telecommunication highways may be forced to be in phase with the data on each of the other telecommunication highways.

The multiplexing step may include multiplexing N highways each running at rate R into the single input data stream running at the higher rate of N times R, and the demultiplexing step may include demultiplexing the output data stream running at rate N times R into N highways each running at rate R. The multiplexing step may include converting the serial data streams of each highway to parallel data and then reformatting the parallel data into a multiplexed serial form to create the input serial data stream, and the demultiplexing step may include converting the output serial data stream into parallel data and then reformatting the parallel data into a demultiplexed serial form to create the serial data streams of each highway. The multiplexing step may employ N number of M bit serial-in-parallel-out (SIPO) shift registers connected to an M times N bit parallel-in-serial-out (PISO) shift register and the demultiplexing step may employ an M times N bit SIPO shift register connected to N number of M bit PISO shift register. The N number of highways may be at least four and the rate R may be at least 1.536 Mbps.

The method may link highways internal to a user to highways external to the user, the external highways including two T-1 lines and the internal highways including at least one highway of multiplexed voice channels. The time slot interchange method may be completely non-blocking.

The transferring step may include rearranging the order of the data in the output buffer relative to the order of the data in the input buffer. The transferring step may include broadcasting some of the data from the input buffer into multiple locations in the output buffer. The method may be scalable to accommodate any amount of data.

The present invention is also directed to a method for performing a time slot interchange in a processor with a minimum of frame delay. The method includes the steps of: accepting an input serial data stream through a serial port in the processor; buffering the input serial data stream in two input buffers in the processor, wherein the digital data on the input and output serial data streams is grouped into frames of data, and further wherein the two input buffers include one for buffering the odd-numbered frames and one for buffering the even-numbered frames; transferring data from the input buffer to an output buffer in the processor in a fashion which remaps the data in the input buffer into data in the output buffer, wherein the transfer includes reading data from the input buffers non-sequentially and includes writing data to the output buffer sequentially, wherein the output buffer is a circular buffer to allow the writing to the output buffer to be performed in a continuous fashion, automatically wrapping around from the last location in the output buffer to the first location in the output buffer; and providing an output serial data stream from the output buffer through a serial port in the processor.

The present invention is also directed to a processor-based apparatus for performing a time slot interchange completely therewithin with a minimum of frame delay. The apparatus includes a processor having an input serial port, an output serial port, a memory, and a program control unit to control the processor based on stored instructions and external commands. The memory is utilized to create two input buffers into which an input serial data stream received through the input serial port can be buffered. The memory is also utilized to create an output buffer from which an output serial data stream can be generated and supplied out of the processor through the output serial data port. The program control unit controls the memory to transfer data between the input buffers and the output buffer in a fashion which remaps the data in the input buffer into data in the output buffer to perform a time slot interchange.

The apparatus may be used to link multiple digital telecommunication highways which each transport channels of digital data, which channels can include voice channels, data channels, or video channels, or any combination thereof. The apparatus further includes external circuitry which multiplexes the digital data from each of the telecommunication highways into the input serial data stream, the input serial data stream being of a higher rate than the serial data streams of the telecommunication highways, and which circuitry also demultiplexes the data from the output serial data stream into serial data streams for each of the telecommunication highways. The output serial data stream is of a higher rate than the serial data streams of the telecommunication highways.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings.

DETAILED DESCRIPTION OF THE PREFERRED EMBODIMENTS

Figure 1:
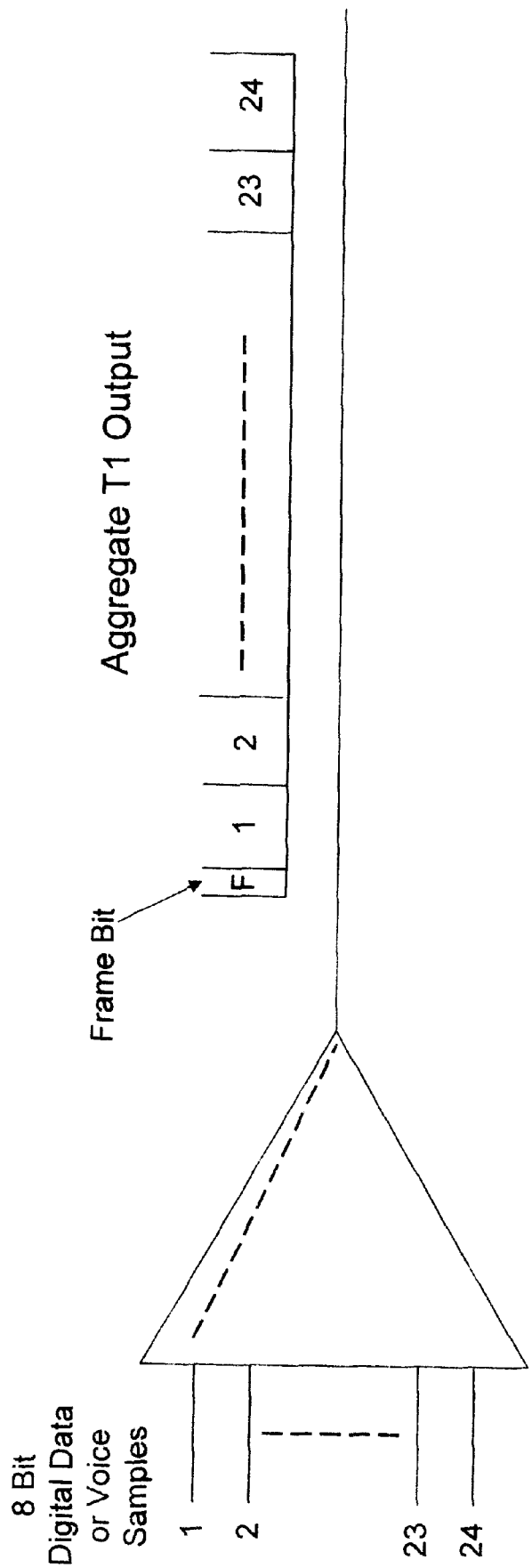
FIG. 1 is a diagram of T-1 multiplexing.
Figure 2:
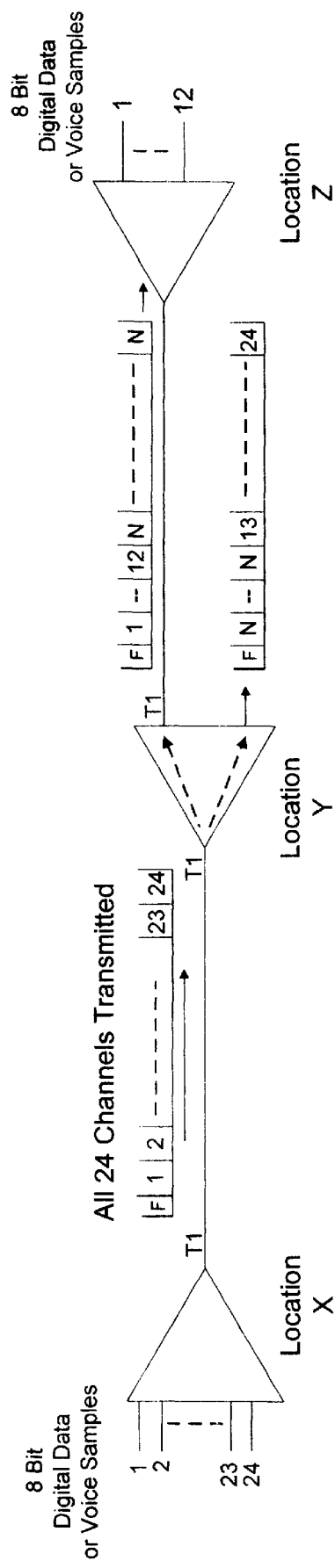
FIG. 2 is a diagram of T-1 drop and insert grooming.
Figure 3:
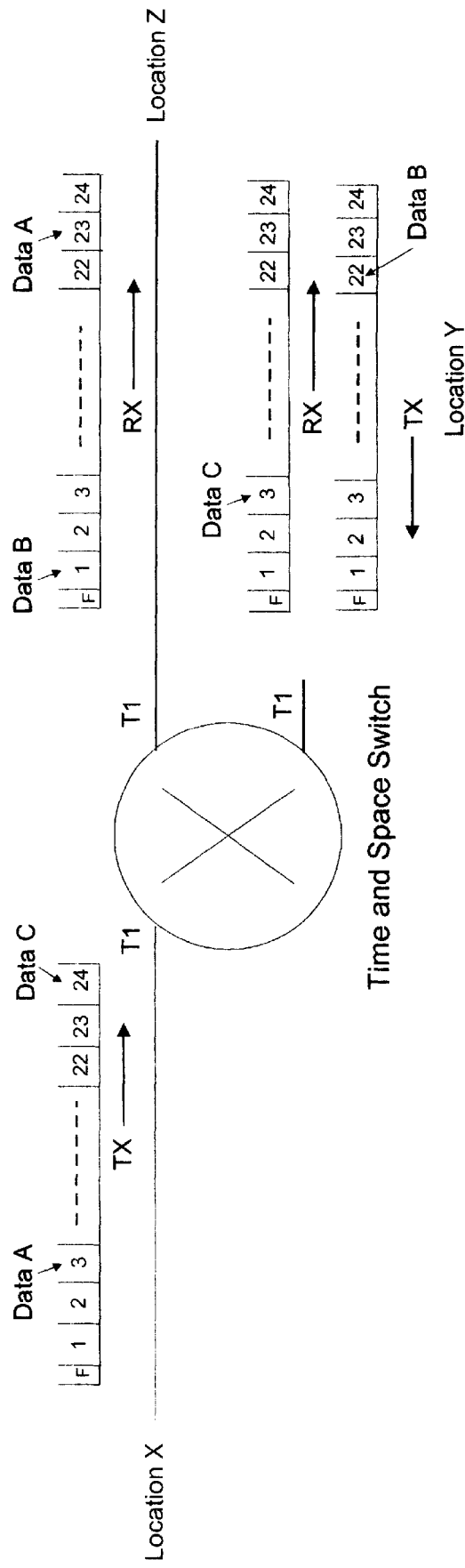
FIG. 3 is a diagram of T-1 digital access and cross connect switching.
Figure 4:
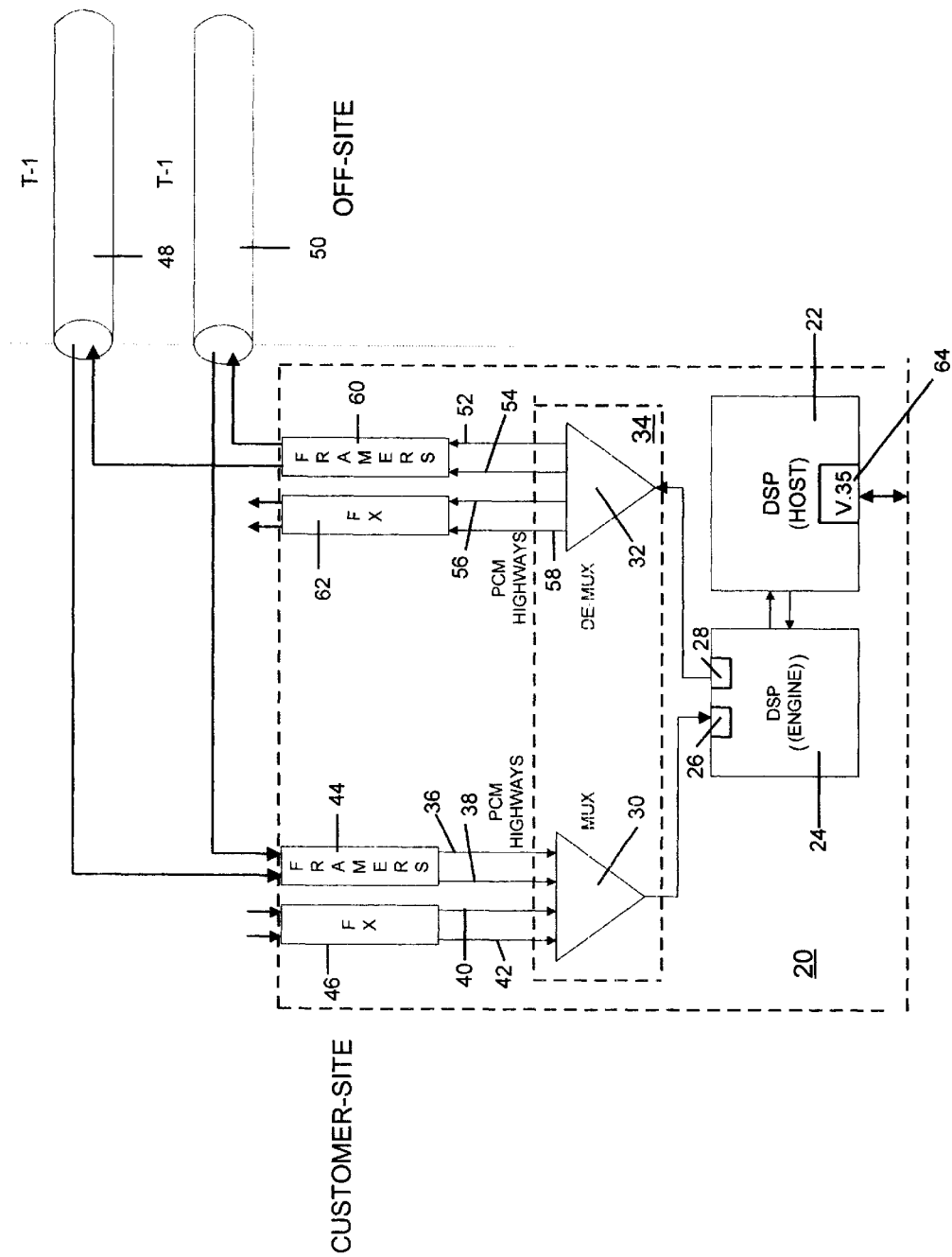
FIG. 4 is a block diagram of the processor-based voice and data time slot interchange system of the present invention.

A processor-based voice and data time slot interchange system 20 embodied in the Access Bank Model II is an intelligent dual port T-1 integrated voice and data multiplexer/DACS equipped with integrated pairs of Channel Service Units (CSUs) and Data Service Units (DSUs). It supplies up to 3.072 Mbps of synchronous bandwidth capacity for connecting customer premises telecommunications equipment to public and private network DS-1 services. FIG. 4 provides a simplified functional block diagram of the Access Bank II. Many of the details of the Access Bank II of the present invention are similar or identical to the earlier generation product, the Access Bank I, which is described more fully in U.S. Pat. No. 5,740,241, filed on May 12, 1995, the contents of which are incorporated herein by reference.

The system 20 includes a DSP host 22 (digital signal processor) which communicates with a DSP engine 24. The DSP engine 24 includes a pair of buffered serial ports (BSPs) 26 and 28, one 26 for input and one 28 for output. The BSPs 26 and 28 can support high speed data such as at four times DS-1 (T-1) rates, if not eight or sixteen times. The input BSP 26 converts an incoming serial data stream into parallel eight-bit data. The output BSP 28 converts parallel eight-bit data into an outgoing serial data stream. The BSPs 26 and 28 are connected to a multiplexer 30 and a demultiplexer 32, respectively, which are embodied in a field programmable gate array (FPGA) 34. In this embodiment, the multiplexer 30 receives signals from four PCM highways 36, 38, 40, and 42, although the design could be similarly adapted to accommodate any desired number of PCM highways. In this embodiment, two PCM highways 36 and 38 come from a pair of conventional T-1 lines 48 and 50 via conventional framers 44. The framers 44 provide signal conditioning and strip the frame bit (the 193rd bit which is conventionally added to the frame so that a code may be provided thereon in sequential frames to indicate the beginning or end of a frame) from each frame of data, among other things. In this embodiment, a frame is 193 bits long and includes the frame bit as well as eight bits from each of twenty-four channels. At 8 kHz (the conventional data rate to communicate digitized voice), this means each frame is 125 microseconds long, and the bit rate is 1.544 Mbps.

The other two PCM highways 40 and 42 are created by FX cards 46, which convert a plurality of analog phone lines to digital and multiplex these digital representations, among other things. These analog phone lines may be connected to conventional telephones, fax machines, modems, and the like. The T-1 lines 48 and 50 also receive demultiplexed signals from the demultiplexer 32 via framers 60, which also provide signal conditioning and add a frame bit to each frame of data. The demultiplexer 32 creates four PCM highways 52, 54, 56, and 58, two of which (52 and 54) are connected to the framers 60. The other two PCM highways 56 and 58 connect to FX cards 62, which demultiplex the signals and convert to analog phone lines. For connection to higher bandwidth signals, the DSP host 22 includes a V.35 data port 64, configured for up to 1.536 Mbps.

T-1 Access

Because the dual T-1 network interfaces supply over 3 Mbps of useable bandwidth, the Access Bank II 20 is able to demultiplex the signals on the primary incoming T-1 line 48 into 12 or 24 analog telephone circuits for connection to voice, facsimile, and high-speed V.34 modems, leaving the secondary T-1 line 50 available for Internet connection via the V.35 port 64, or for redundant backup to alternate routes or carriers. Doubling the bandwidth of a conventional digital channel bank allows the Access Bank II 20 to dedicate the built-in V.35 DCE data port 64 to Internet, video, or Wide-Area Network (WAN) applications, while also performing such advanced networking tasks as Drop and Insert (D&I), one-to-one Automatic Protection Switching (APS), and DS-0 Digital Access & Cross-connection (DACS). Both diagnostic CSUs (not shown) are fully integrated, respond to all standard inband and out-of-band network loop codes, and can be polled for ANSI T1.403 one-second Performance Report Messages (PRMs) or AT&T 54016 Maintenance Messages over the 4 Kbps ESF Facility Data Link (FDL).

Digital Data Ports

To fully utilize the expanded bandwidth supplied by the dual T-1 interfaces, the Access Bank II has the built-in V.35 DCE data port 64 for connection to Wide Area Network (WAN) devices such as Internet routers and Frame Relay Access Devices (FRADs). This high-speed serial interface supports synchronous data connections from 56 Kbps to 1.536 Mbps in 1, 2, 3, 4, 6, 8, 12, or 24 N×56/N×64 Kbps steps. When used in conjunction with an internal BER (Bit Error Rate) tester, the V.35 interface is also capable of generating V.54 loop codes for activating and deactivating remote loopbacks in DCE devices at the far-end. The intervening transmission link then can be stress tested using a selectable range of industry standard QRSS patterns (QRSS, All Zeros, All Ones, 511, 2047, $2^{15}-1$, $2^{20}-,2^{23}-1$, etc.).

The Access Bank II 20 also contains an RS-232 secondary data port (not shown) that can be configured to provide a 56/64 Kbps synchronous data channel for connection to SNA cluster controllers, data multiplexers, routers, or SCADA (Supervisory Control and Data Acquisition) links. When configured for asynchronous operation, this same RS-232 data port can also be used, alternately, to implement a point-to-point dedicated communications channel between two Access Bank IIs 20 at 9.6, 19.2, 28.8, 38.4, 48.0, or 57.6 Kbps rates. This allows managing the Access Bank II 20 as a sub-element from larger service distribution multiplexers (access server, Sonet multiplexer, digital radio).

Analog Line Interfaces

To meet individual site-specific communications requirements, the Access Bank II 20 can be equipped a full range of "hot-swappable" slide-insert analog line interface cards:

a. The Foreign Exchange Station (FXS) 12-channel voice card (not shown) delivers high quality loop-start or ground-start dial tone telephone line connections to key systems, Off Premise Extensions (OPXs), facsimile machines, modems, PBXs and other conventional analog telephone devices.

b. The Foreign Exchange Office and Dial Pulse Termination (FXO/DPT) voice card (not shown) compliments the FXS by supplying 12 standard loop-start or ground-start telephone line connections on a per channel basis from PBX office-end telephone systems to public network T-1 (DS-1) services using FXO terminations. The DPT feature of this card is especially useful in remote office or campus T-1 environments where it can be used to support one-way Direct Inward Dialing (DID) service for voice mail and call center applications.

c. A Battery Reversal FXS/Dial Pulse Origination (BRFXS/DPO) voice card (not shown) is also available that provides twelve 2-wire CPE analog loops to the digital T-1 (DS-1 line).

d. The 4-wire E&M/Transmission Only (E&M/TO) voice card (not shown) supplies 12 channels for connecting to private line circuits, such as PBX tie lines and 4-wire modems often found in utility, cellular, and metropolitan area networks (MANs). Each of the twelve E&M channels can be individually programmed to support Signaling Types I, II, IV or V. This card can also be configured to function as Channel Equipment (normal multiplexer mode) or as Switching Equipment for back-to-back Tandem operation sometimes referred to as "Reverse E&M" or "Pulse Link Repeater." The Transmission Only (TO) operating mode provides dedicated one-way transmission paths to radio and modem equipment uncorrupted by the insertion of A/B robbed bit signaling.

All analog line interface cards greatly exceed the required analog loop range and are proven V.34 modem compatible. Using a feature described in the previously referenced U.S. Pat. No. 5,740,241, automatic impedance matching is performed to adapt to various analog modem types and line lengths. Over-voltage and over-current protection are individually handled on the analog interface channel cards, as well as on the Controller. This distributes the power redundantly so that a line fault or over-voltage on one analog channel card does not affect the operation of another.

With double the bandwidth capacity of a conventional D-type channel bank, the Access Bank II 20 is able to combine the functions of an intelligent CSU/DSU, digital access & cross-connect system (DACS), automatic protection switch (APS) and D-type channel bank within a single product that addresses 90% of T-1 termination and private network applications. The Access Bank II 20 does this all at a lower cost, higher bandwidth, easier installation, and better service point than dual T-1 drop and insert (D&I) banks at 1.5 Mbps. The Access Bank II 20 provides APS as a built-in function. Although external protection switches are commercially available, it is uncommon to find Automatic Protection Switching of T-1 lines as a built-in function in Customer Premises Equipment. Not only does the Access Bank II 20 offer more features and greater flexibility than a conventional single T-1 channel bank, but is also smaller and far cheaper than high-end digital switches, multiplexers or a full-featured DACS.

Buffered Serial Multiplexing and Demultiplexing

One innovative feature of the Access Bank II 20 is the multiplexer and demultiplexer 30 and 32 that utilize buffered serial multiplexing and demultiplexing to byte interleave frame synchronized PCM streams into a single higher rate PCM stream. N number of PCM (Pulse Code Modulation) communication highways running at rate R are multiplexed together into a single PCM stream running at rate N×R, and a single PCM stream at rate N×R is demultiplexed into N constituent rate R streams. In this embodiment, R is 1.544 Mbps, and N is four, so N×R is 6.176 Mbps. Elastic stores (buffers) in the framers absorb frame misalignment of PCM streams at the network interface in order to force PCM frames to align with internally generated frame synchronization pulses. In other words, due to the elastic stores and the inherent nature of the present invention, the PCM highways are all forced to be frame synchronous with one another. Also, the higher rate input serial data stream created by the multiplexer 30 is frame synchronous with the output serial data stream from the TSI process performed by the processor 24. When used in conjunction with the auto-buffered serial ports 26 and 28, the method of DS-0 byte interleaving for serial acquisition of multiple digital communications channels in a TSI (Time Slot Interchange) system shortens delay, provides a scalable bandwidth, increases efficiency, and minimizes input/output circuitry.

Figure 5:
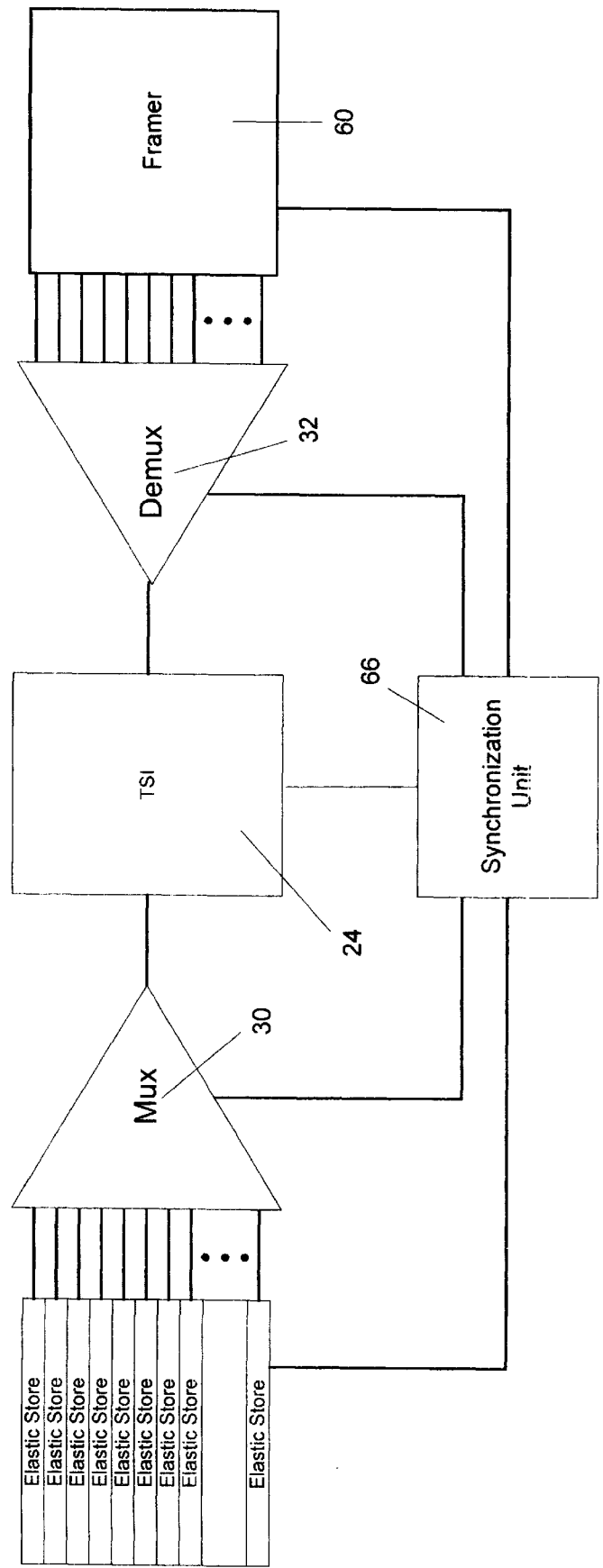
FIG. 5 is a top level block diagram of the multiplex/demultiplex function, shown in FIG. 4.

FIG. 5 provides an overview of the entire buffered serial multiplexing/demultiplexing process explained below as referenced in greater detail in FIGS. 6–8. A synchronization unit 66 in the FPGA 34 communicates with the multiplexer 30 and demultiplexer 32 as well as the elastic stores and the framers 60. The FPGA employed in this embodiment is Model No. EPF8636AQC160-4 from Altera Corporation of San Jose, Calif.

Figure 6:
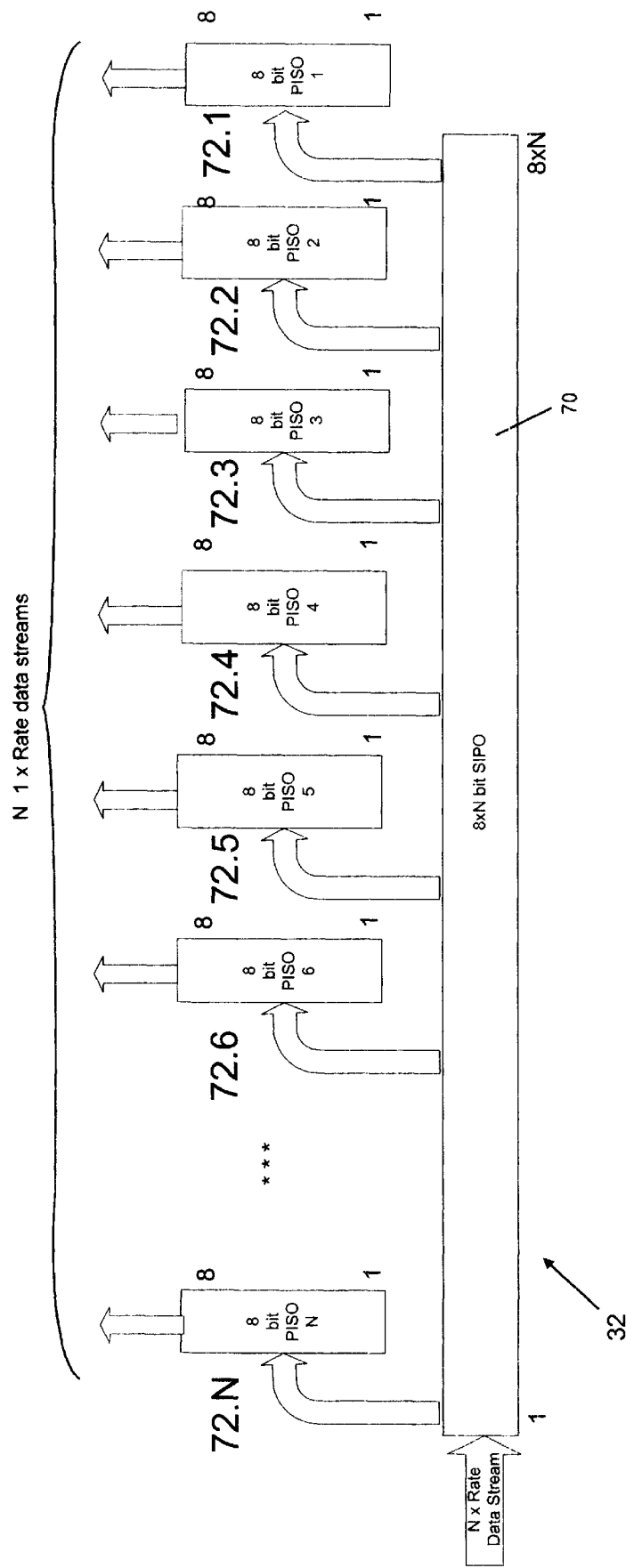
FIG. 6 is a block diagram of the demultiplexing function of FIG. 5.

In FIG. 6, a N×Rate data stream (6.176 Mbps, in this embodiment) is incident to a 8×N bit (32 bits, in this embodiment) SIPO (Serial In Parallel Out) shift register 70. Here N eight-bit PISO (Parallel In Serial Out) shift registers 72.1 through 72.N, are used to clock 1×Rate data out. The N PISOs are loaded with the contents of the 8×N bit SIPO 70 in a parallel fashion coincident with the last valid data clocked out of register 8 of the PISOs 72.1 through 72.N. Valid data is clocked serially out of Register 8, while invalid data is clocked into Register 1 of the PISOs 72.1 through 72.N. In this way, valid data is shifted from Register 1 to Register 2, from Register 2 to Register 3, and so on, etc. In a similar fashion, valid data is clocked into Register 1 of the 8×N bit SIPO 70 and then clocked from Register 1 to Register 2, from Register 2 to Register 3, and so on, etc. The data is passed from register to register until it is finally clocked into Register 8×N, where the next clock replaces it with more current data and the original data is lost.

Figure 7:
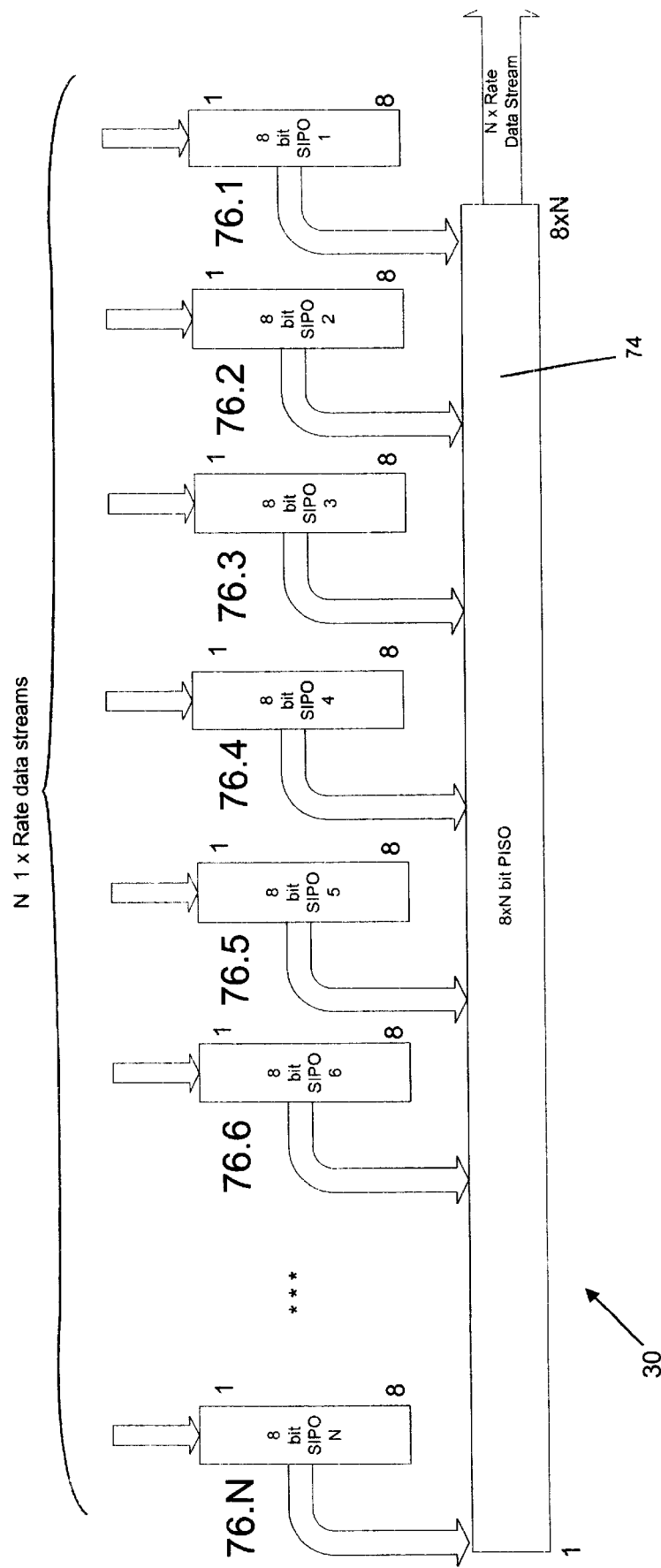
FIG. 7 is a block diagram of the multiplexing function of FIG. 5.

In FIG. 7, a N×Rate data stream (6.176 Mbps, in this embodiment) is clocked from a 8×N bit PISO shift register 74. At the same time, N number of 1×Rate data steams are clocked into N number of 8 bit SIPOs 76.1 through 76.N, respectively. The 8×N bit PISO 74 is loaded in parallel immediately before the valid data clocked out of Register 8 of each of the N number of 8 bit SIPO registers 76.1 through 76.N. This coincides with the last valid data clocked out of register 8×N of the 8×N bit PISO 74. Valid data is clocked from Register 1 to Register 2, from Register 2 to Register 3, from Register 3 to Register 4, and so on, etc.

Figure 8:
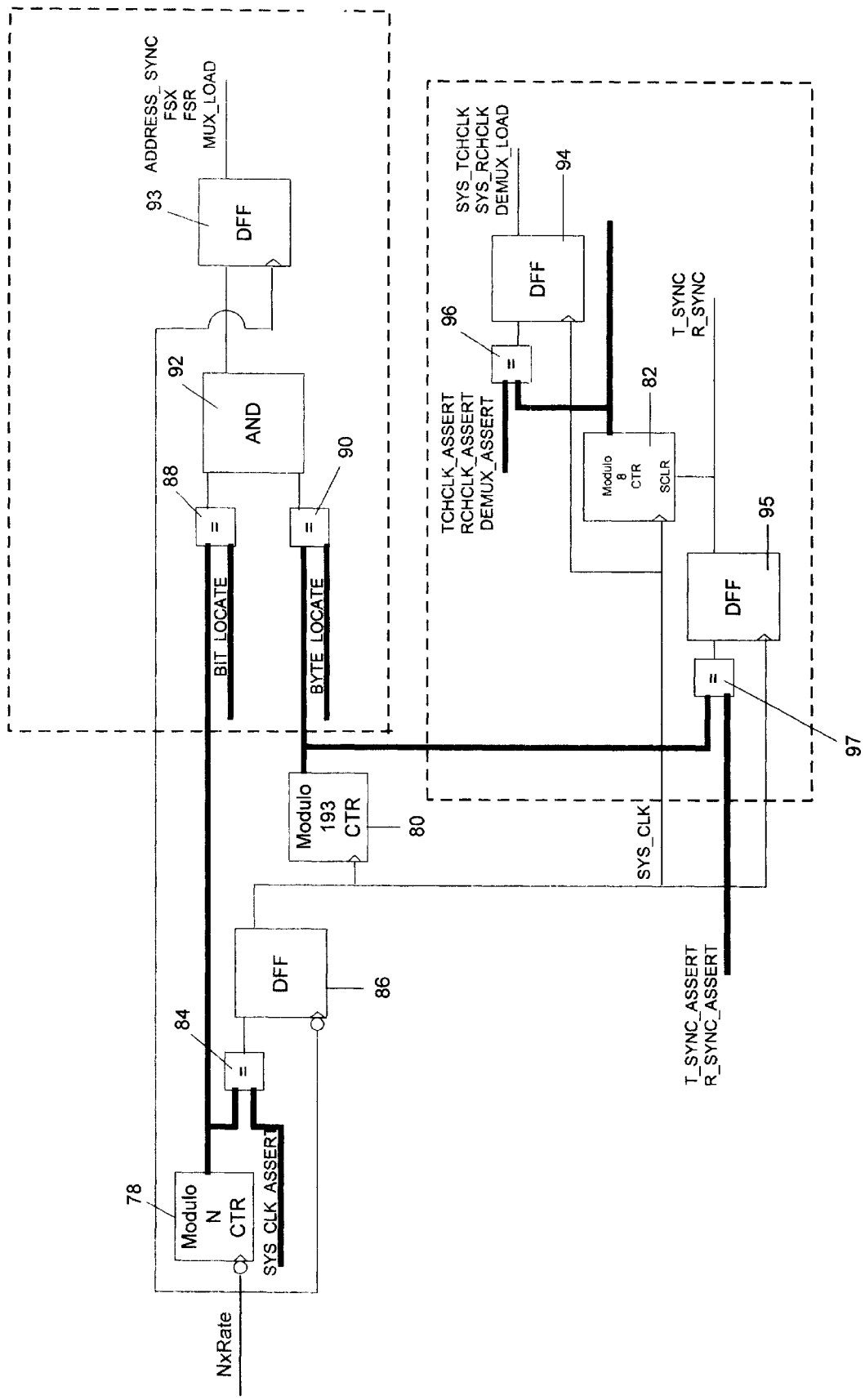
FIG. 8 is a diagram of synchronization signal generation in the system shown in FIG. 4.

FIG. 8 details the operation of the synchronization unit 66 in the FPGA 34. The synchronization unit 66 generates clocking for the entire system and forces synchronization of PCM highways to allow individual channels (DS-0s) to be switched. The synchronization unit 66 also provides signaling to the processor so that the processor knows exactly which channel it is receiving or transmitting at any instance in time. The core of the synchronization unit 66 is a modulo-N counter 78 which is used to divide a N times R (rate) clock (which is locked to an internally-generated reference clock or to a clock supplied externally via the network) down to a system clock at an R rate.

The system clock (SYS_CLK) clocks a modulo-193 counter 80. The current value of the modulo-193 counter 80 indicates the current bit in an R rate PCM highway. A modulo-193 counter was chosen because of the existing T-1 design specification, which design could be adapted to PCM highways of arbitrary length.

There are two separate modulo-8 counters 82 (only one of which is shown, as one box represents both the counter for T-signals and the counter for R-signals), which are cleared synchronously at predetermined count values in the modulo-193 counter 80. The modulo-8 counters 82 are therefore set to a known value once every 193 bits of R rate data. This results in a free-running counter that indicates bit position in the current PCM byte.

These four counters 78, 80, and 82 provide the necessary information to locate to the bit level in any of the PCM highways both at the R rate and at the N time R rate. An equate 84 is used to define the SYS_CLK. It generates an R rate square wave via combinatorial logic. A simple D-type register 86 is used to remove any glitches resulting from the square wave. The register 86 is clocked on the falling edge of the N times R rate clock. A second equate 88 off of the modulo-N counter 78 indicates a particular bit location in the N times R rate data but does not indicate which particular byte. A third equate 90 off of the modulo-193 counter 80 indicates the location of a single byte in the N times R rate data. An AND gate 92 combines the second and third equates 88 and 90 to allow locating any bit in any byte of the N time R rate data. D-type registers 93, 94, and 95 are used to remove glitches from AND gate 92, fourth equate 96, and fifth equate 97, respectively. Register 93 is clocked on the rising edge of the N times R rate clock, while registers 94 and 95 are clocked on the rising edge of SYS__CLK. The fourth equate 96 is off of the modulo-8 counter 82 and indicates the position of a particular bit in the R rate data. The fifth equate 97 is off of the modulo-193 counter 80 and indicates the location of the frame bit in the R rate data.

The resultant signals, FSX and FSR, shown in FIG. 8 indicate to the input BSP 26 and the output BSP 28, respectively, the byte boundaries within the N times R rate data. The resultant signal SYS__TCHCLK indicates to the framers 60 and the FX cards 62, byte boundaries within the R rate PCM highways. The resultant signal SYS__RCHCLK indicates to the framers 44 and the FX cards 46, byte boundaries within the R rate PCM highways. The resultant signals MUX__LOAD and DEMUX__LOAD are signals to the multiplexer 30 and the demultiplexer 32, respectively, controlling the transfer of data from SIPO 76 to PISO 74 and from SIPO 70 to PISO 72, respectively. The labels appended with __ASSERT and __LOCATE are design constants chosen to give the correct alignment between R rate and N times R rate PCM highways. Hardware constructs contained within dashed lines in FIG. 8 represent a duplicated hardware construct for each signal name, with the duplicates omitted for ease of understanding.

Time Slot Interchange (TSI)

Figure 9:
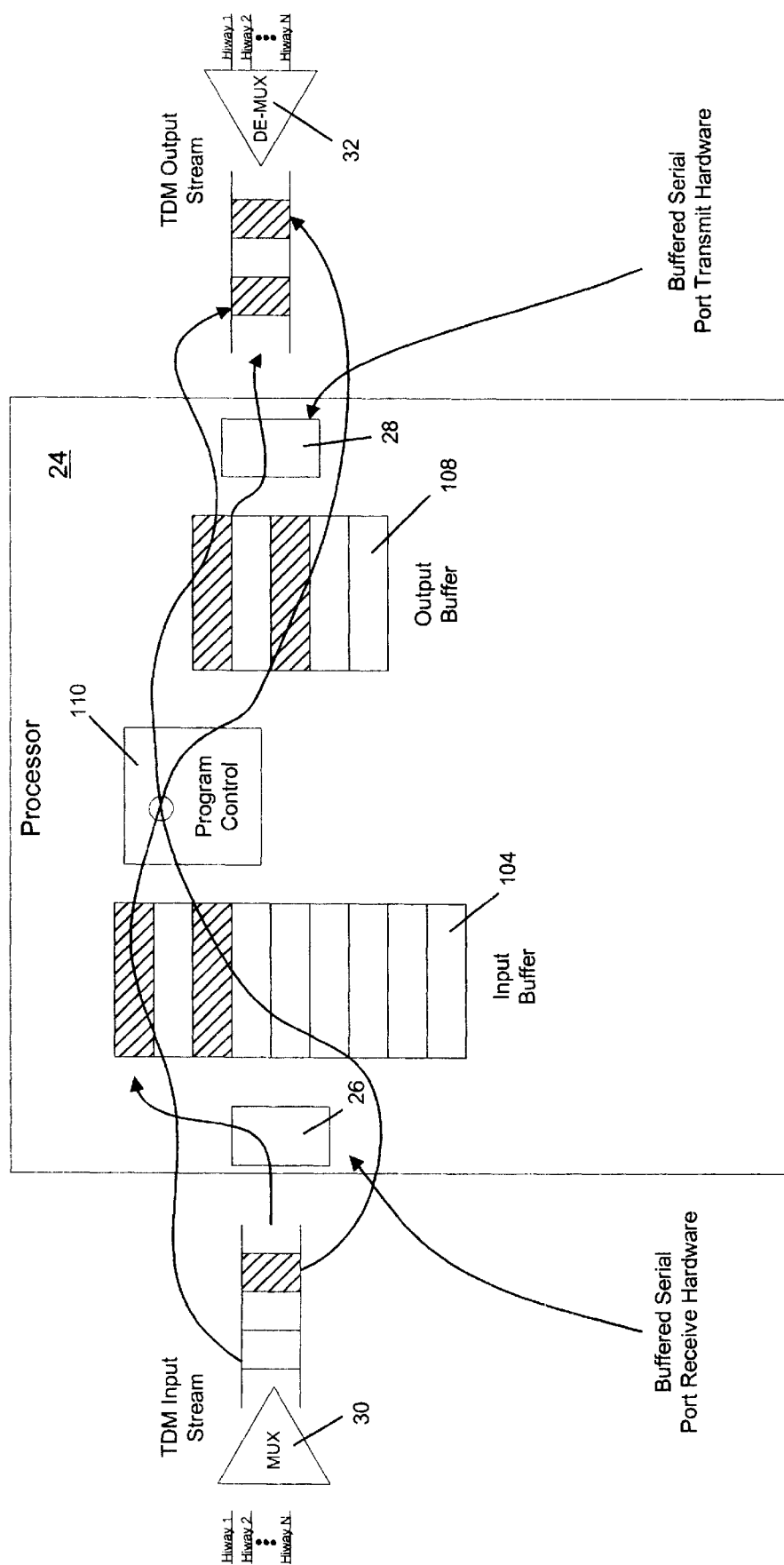
FIG. 9 is a diagram of the operation of Time Slot Interchange (TSI) using the processor of FIG. 4.

As shown in FIG. 9, another innovative feature of the Access Bank II 20 is the new technique of high-capacity Time Slot Interchange (TSI) used to implement a telecommunications switch run by a DSP processor optimized to move data between memory locations in associated RAM (Random Access Memory). The processor 24 itself includes two address buffers or connection arrays 100 and 102, which are used to randomly address two corresponding input buffers 104 and 106 and an output buffer 108.

The data stored in these connection arrays 100 and 102 determines the time slots to be mapped from the input buffers 104 and 106 to the output buffer 108. This mapping may include simply rearranging the order of the time slots to connect any given customer-site telephone to a time slot on a T-1 line coming from off-site which corresponds to an off-site telephone, or it may include any other possible type of mapping. This may also include Automatic Protection Switching (APS) or may include broadcasting such as sending the data from any one time slot to multiple time slots, such as in tele-conferencing. More on APS is available in AT&T Pub. 54017 (January 1986), which is incorporated herein by reference. The contents of the connection arrays 100 and 102 is controlled by remote monitor switching provided by the DSP host 22.

The input data is switched from the proper input buffer to the output buffer utilizing the program control unit 110 in the processor 24. Sequential moving pointers in the DSP processor 24 write data to the input buffers and read it from the output buffers. The incoming and outgoing data stream is a PCM (Pulse Code Modulation) serial highway multiplexed up to contain frames from N different PCM highways (four, in this embodiment).

This advanced fusion of high-capacity TSI with enhanced DSP processing power means that the Access Bank II 20 is able to achieve a very low three frames maximum T-1 to T-1 delay (0.375 ms), while also maintaining a constant rate of frame-to-frame delay. The TSI process itself achieves a frame delay of only one frame plus six DS-0 channels.

The invention is used to create a high-capacity Time Slot Interchange (TSI) switch for interconnecting various communications channels in telecommunications equipment. In the past, implementing TSI circuits in hardware resulted in product inflexibility by consuming circuit board space, wasting power and limiting available bandwidth capacity. Implementing TSI within a DSP processor makes it possible to build an application based on this core TSI technique that overcomes these earlier limitations.

A basic diagram of the operation of the TSI switch appears in FIG. 9. The processor 24 includes at least one input buffer 104 and the output buffer 108. The processor 24 also contains the program control unit 110 for executing programs. The receive or input buffered serial port (BSP) 26 takes an incoming serial bit stream and then moves it to the input buffer 104. Similarly, the transmit or output BSP 28 moves internal data from the output buffer 108 to an outgoing serial bit stream.

Figure 10:
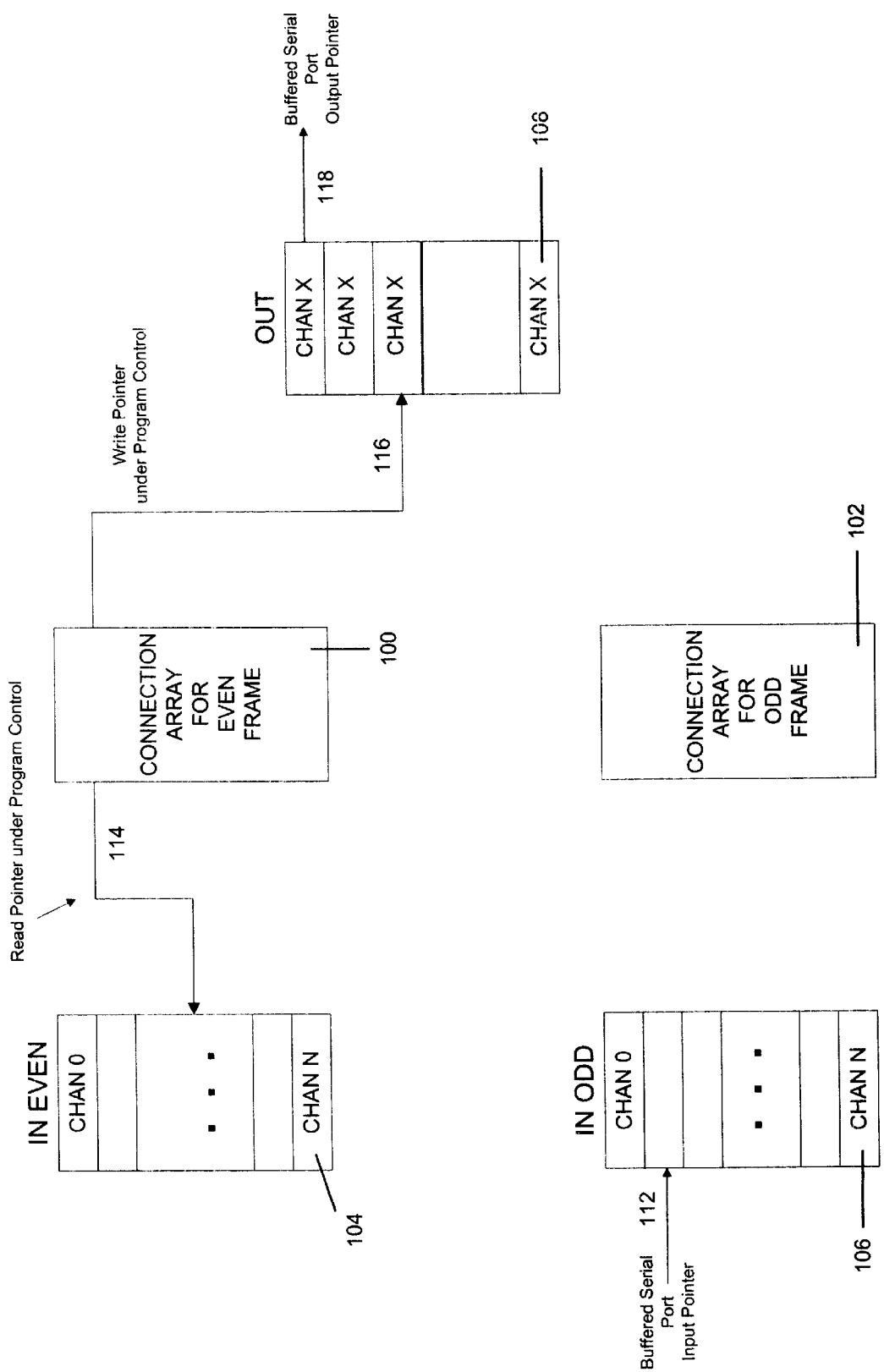
FIG. 10 is a diagram of the memory arrays internal to the processor shown in FIG. 9.

FIG. 10 is a more detailed diagram of this same process. Although any number of input or output buffers could be used, in this best case example the two input buffers 104 and 106 and the one output buffer 108 are used to minimize delay through the TSI. The two input buffers 104 and 106 receive data sequentially from the input BSP 26 by means of an input pointer 112. When either one of the input buffers 104 and 106 is full, the data is transferred from it to the output buffer 108 under the direction of Program Control. Data is read from the input buffers 104 and 106 randomly (non-sequentially) and written to the output buffer 108 sequentially. The even connection array 100 for even frames contains the random read address for the even input buffer 104. Similarly, the connection array 102 for odd frames contains the random read address for the odd input buffer 106. Data could just as well be read from the input buffer(s) sequentially and written to the output buffer(s) randomly, however.

Because their locations in memory do not start at location 0, the offset locations of the input buffers 104 and 106 are added to the random channel number before this address is written to the connection arrays 100 and 102. Calculating this address in advance avoids having to perform this same calculation during the TSI process, which would, in turn, slow down that process. The processor 24 then obtains this read pointer 114 simply by reading sequentially out of the connection array 100. It then uses this pointer 114 to read data from the corresponding input buffer and writes it sequentially to the output buffer 108 with a write pointer 116. The data is then passed sequentially from the output buffer 108 to the transmit BSP 28 under control of an output pointer 118.

The high level program control construct is:
  FOR (I:=1 to N step 1)
    OUT[i]:=IN[CONNECT[i]];
  Where N is the number of channels being switched.

Timing and Synchronization

Figure 11:
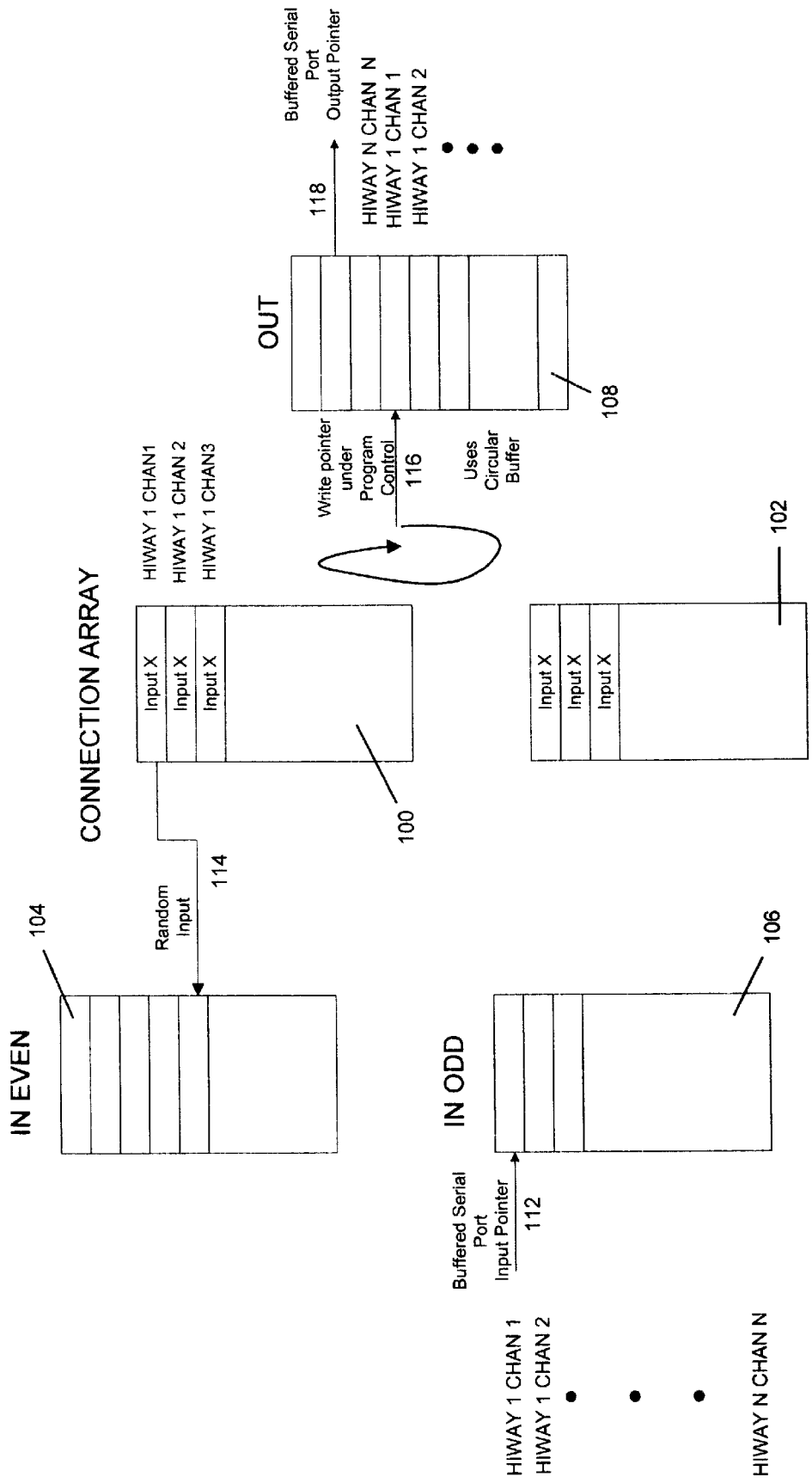
FIG. 11 is a diagram of the location of certain pointers at the beginning of program control of the processor of FIG. 9.

There are numerous methods available for synchronizing the system. However, the preferred system timing method should maintain a constant rate of delay within a frame so that any one channel within the frame has the same rate of delay as any other channel within that same frame. As shown in FIG. 11, proper system operation requires that the write pointer 116 under program control must be able to move faster than the input pointer 112 and the output pointer 114.

How much faster the write pointer 116 moves depends on many factors including how many channels are being interchanged and how fast the processor 24 is operating. Because of these variables, the write pointer 116 under program control is placed only a few channels beyond the output pointer 118. In this way, delay is minimized because data being shifted out by the output pointer 118 is always just recently updated. However, in order to achieve a constant rate of frame delay, the write pointer 116 under program control always updates the first channel of the first highway first. It is not necessary to update the first highway first, but the first channel in any highway must be updated first to maintain a constant rate of frame delay.

Eventually, the write pointer 116 under program control will reach the bottom of the output buffer 108. At this point the write pointer 116 wraps around to the top of the output buffer 108 and finishes transferring data. When it reaches and writes to channel N, the write pointer 116 is finished. By this time the output pointer 118 has cleared Channel N, thereby maintaining proper system synchronization. At this point the processor 24 is free to perform other tasks, such as any of various applications (e.g., PBX, DACS, other types of switches, or other applications), as may be desired. The processor 24 receives a signal to start when the input pointer 112 reaches the top of either the even input buffer 104 or the odd input buffer 106. The input and output pointers 112 and 118 run free and cycle at the frame rate.

Figure 12:
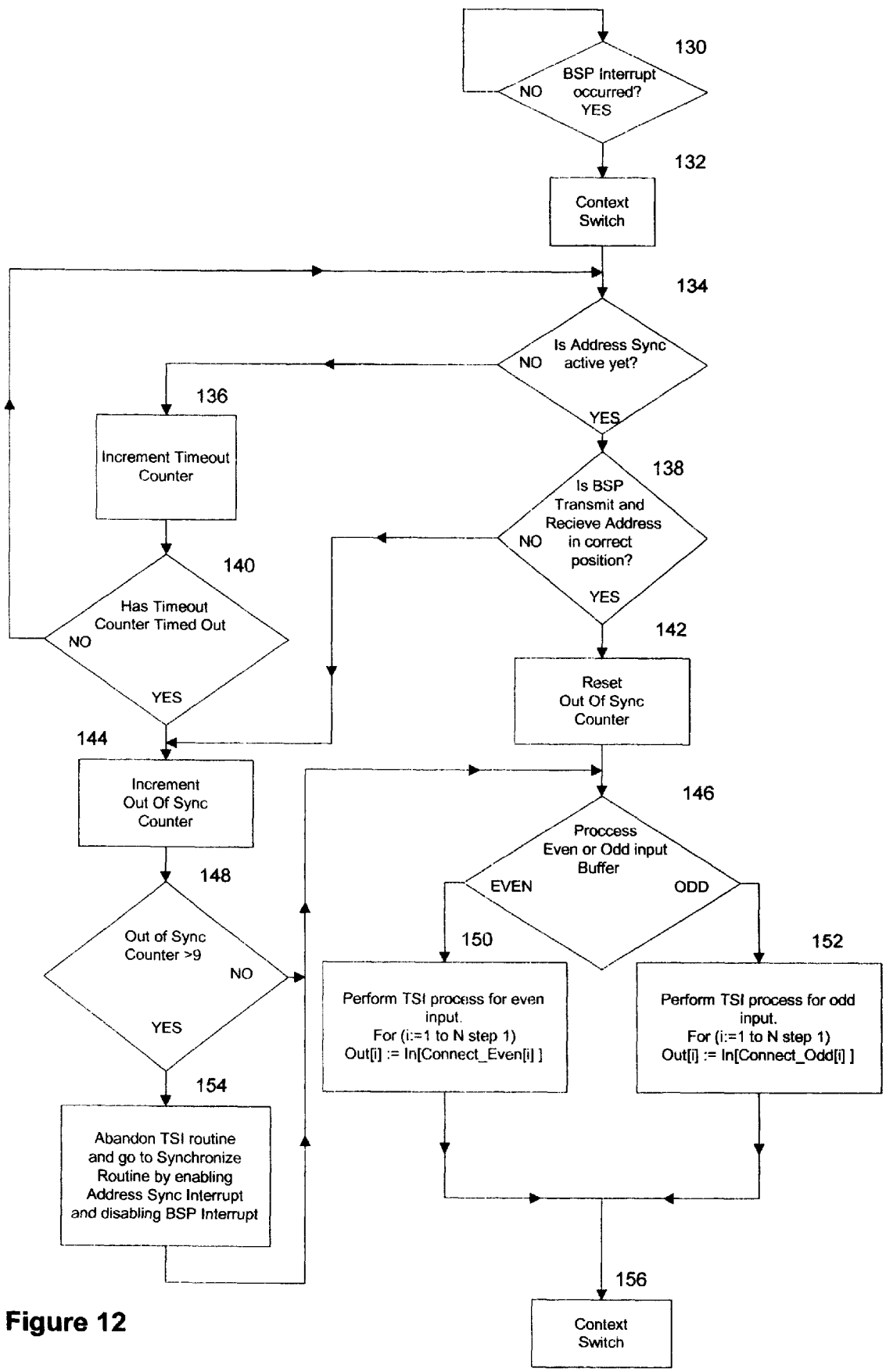
FIG. 12 is a flow chart of the TSI process employed by the processor of FIG. 9.

FIG. 12 is a flow chart that diagrams the operation of program control during the TSI process. The processor 24 continues to execute the application program until [130] there is a BSP interrupt 120, which is determined by the location of the input pointer 112 (process steps will generally be noted with reference numbers either in brackets or used with the word "step"). The even input buffer 104 and the odd input buffer 106 are actually one contiguous buffer. Thus, the interrupt 120 can occur when the input pointer 112 automatically wraps from the bottom to the top of the contiguous buffer, or when it 112 is half way through the buffer (moving from the even input buffer 104 to the odd input buffer 106). Notice that when the input pointer 112 is half way through the single input buffer it is at the beginning of the odd input buffer 106.

Step 130 is performed automatically in the processor hardware 24. The processor 24 continues to execute a program, such as an application, until signaled by the interrupt 120, which can occur any place in the program. Next, a context sensitive switch saves [132] the state of the processor 24 (such as its registers etc.) immediately after the interrupt 120. Then, the processor 24 checks [134] if ADDRESS_SYNC 182 is active or not. If not, a time-out counter is incremented [136]. After being incremented, the time-out counter is checked [140] to determine if ADDRESS_SYNC 182 has taken too long to occur. If it has taken too long, then the out-of-sync counter is incremented [144]. Otherwise, program control is transferred back to step 134.

From step 144, program control moves to step 148 where the number of out-of-sync counts are checked. If there are more than nine out-of-sync counts, then program flow is transferred to step 154. Otherwise, program control is transferred to step 146, so that the TSI process will occur anyway. At step 154, the BSP interrupt 120 is disabled, the ADDRESS_SYNC interrupt is enabled, and control proceeds to step 146.

At step 134, when ADDRESS_SYNC becomes active, program control is transferred to step 138 where the transmit BSP address and receive BSP address are checked to verify they are both pointing to the correct address. If either one is not pointing to the correct address, then program control is transferred to step 144. Otherwise, program control is transferred to step 142, which is what occurs normally. At step 142, the out-of-sync counter is reset to zero. Next, a hardware bit is checked [146] to determine if the even or odd input buffer is to be processed. This hardware bit indicates whether or not the input pointer 112 is at the top or in the middle of the single buffer. Steps 150 and 152 execute the TSI process of the even or odd input buffers, respectively. Next, a context switch restores [156] the state of the processor 24 (such as registers, etc.), so that the application that was running begins again exactly where it left off before it was interrupted for the TSI process.

Figure 13:
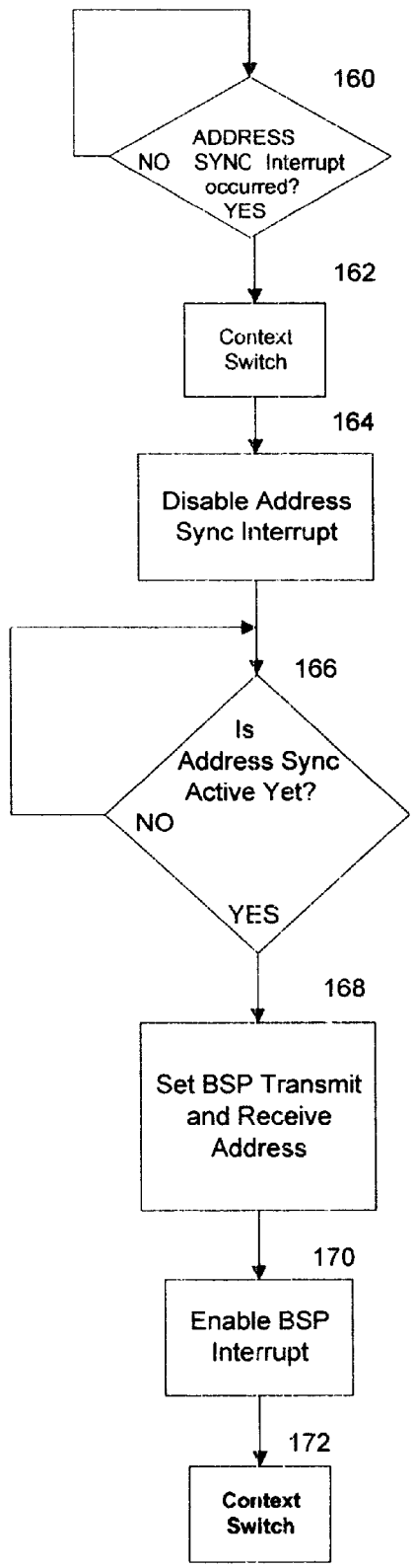
FIG. 13 is a flow chart of the initialization sequence employed by the processor of FIG. 9.

FIG. 13 is a flow chart of the initialization routine that occurs at power up or when the system goes out-of-sync. Step 160 occurs in hardware, so that when the ADDRESS_SYNC signal appears, an interrupt is generated and the program control moves on to step 162 where context switching is performed. At step 164 the ADDRESS_SYNC interrupt is disabled and the program control polls [166] this same signal (ADDRESS_SYNC 182) until it occurs. When this signal goes active, program control moves to step 168 where the BSP transmit and receive addresses are set to their respective values. Then, at step 170 the BSP interrupt 120 is enabled, after which, in step 172, the context switch is run and the application resumes.

Figure 14:
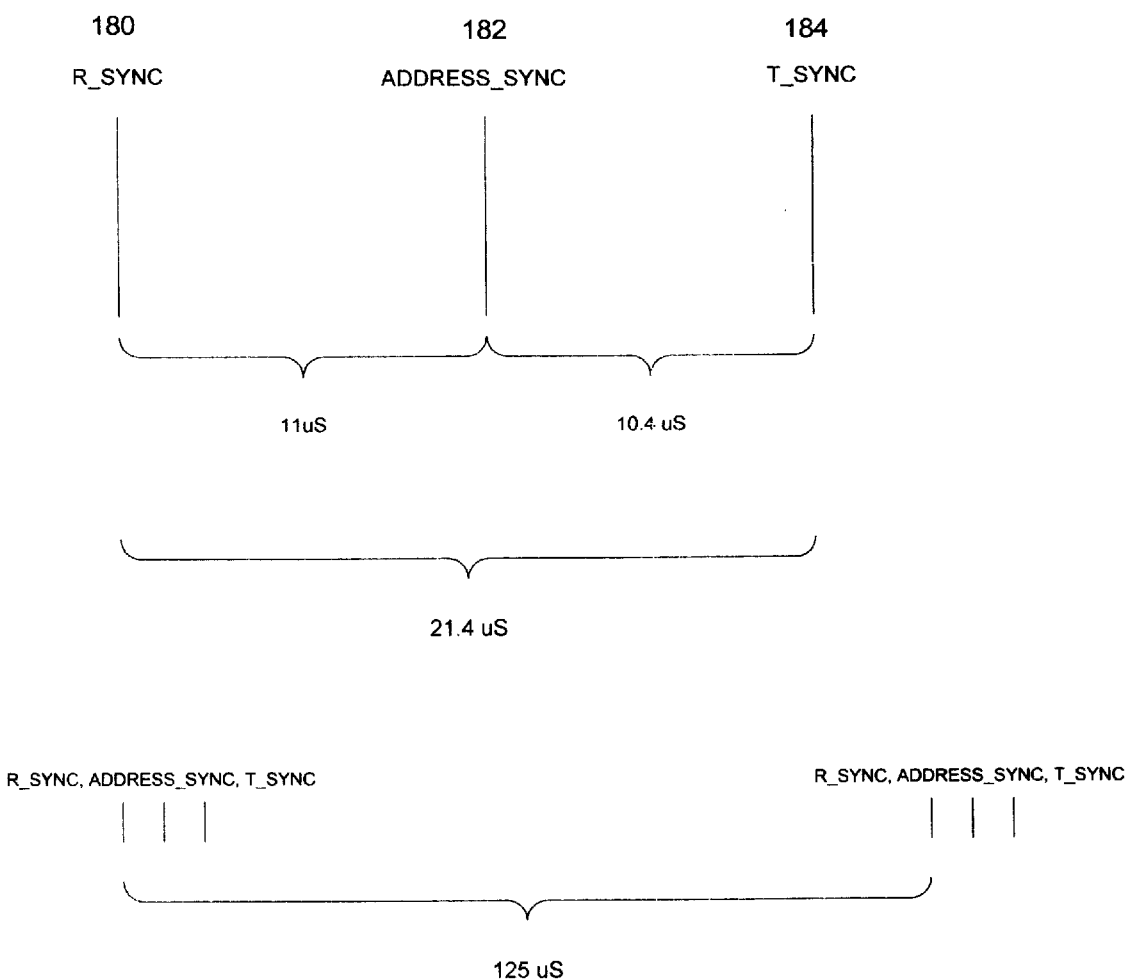
FIG. 14 is a timing diagram of the three timing and synchronization signals from FIG. 8.

FIG. 14 shows the three hardware signals, R_SYNC 180, ADDRESS_SYNC 182, and T_SYNC 184, that are used for synchronization. R_SYNC 180 indicates the start of all received frames as they enter the multiplexer function. ADDRESS_SYNC 182 is used to synchronize the transmit and receive pointers 112 and 118. T_SYNC 184 indicates the beginning of all transmit frames as they leave the demultiplexer function. The data inside the processor and the BSP pointers are arranged to accommodate the deterministic delays that apply to individual frames (PCM highways) to be multiplexed and inserted into the processor 24 as well as to data to be demultiplexed and sent out of the processor 24.

Figure 15:
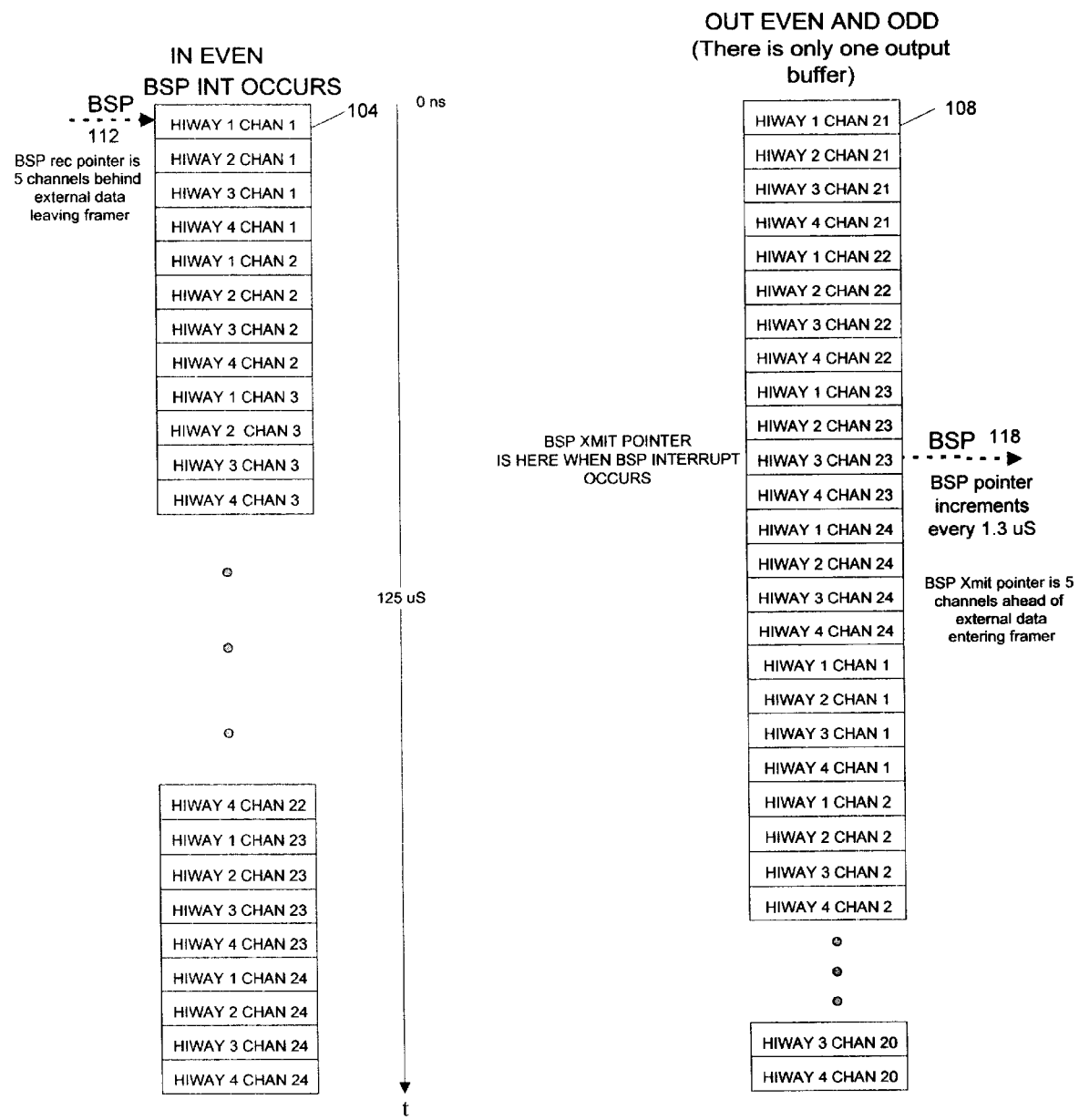
FIG. 15 is a diagram of the location of the BSP pointers at BSP interrupt, in the processor of FIG. 9.

In the example in FIG. 15, the TSI processes frames from each of four PCM highways. Note that the first channel of the first highway is placed in the first location of the even input buffer 104. The odd input buffer 106 is not shown here because it is exactly the same as the even input buffer 104. Note, however, that in the output buffer 108, the first channel of the first highway is not at the beginning of the buffer in order to avoid complications and design constraints. The DSP 24 employed, the TMS320C57 from Texas Instruments, of Houston, Tex. (which is also used for the DSP host 22), supports circular addressing. This means that during the TSI process the first data location that is updated, Highway 1/Channel 1, can be anywhere in the linear array and the pointer updating that array will automatically wrap around to the top without paying a penalty in time.

FIG. 15 is a snap shot of where the input or receive pointer 112 and the output or transmit pointer 118 are at the instant the BSP interrupt 120 starts the TSI process. The next interrupt occurs when the receive pointer 112 points to the first element in the odd input buffer 106.

Figure 16:
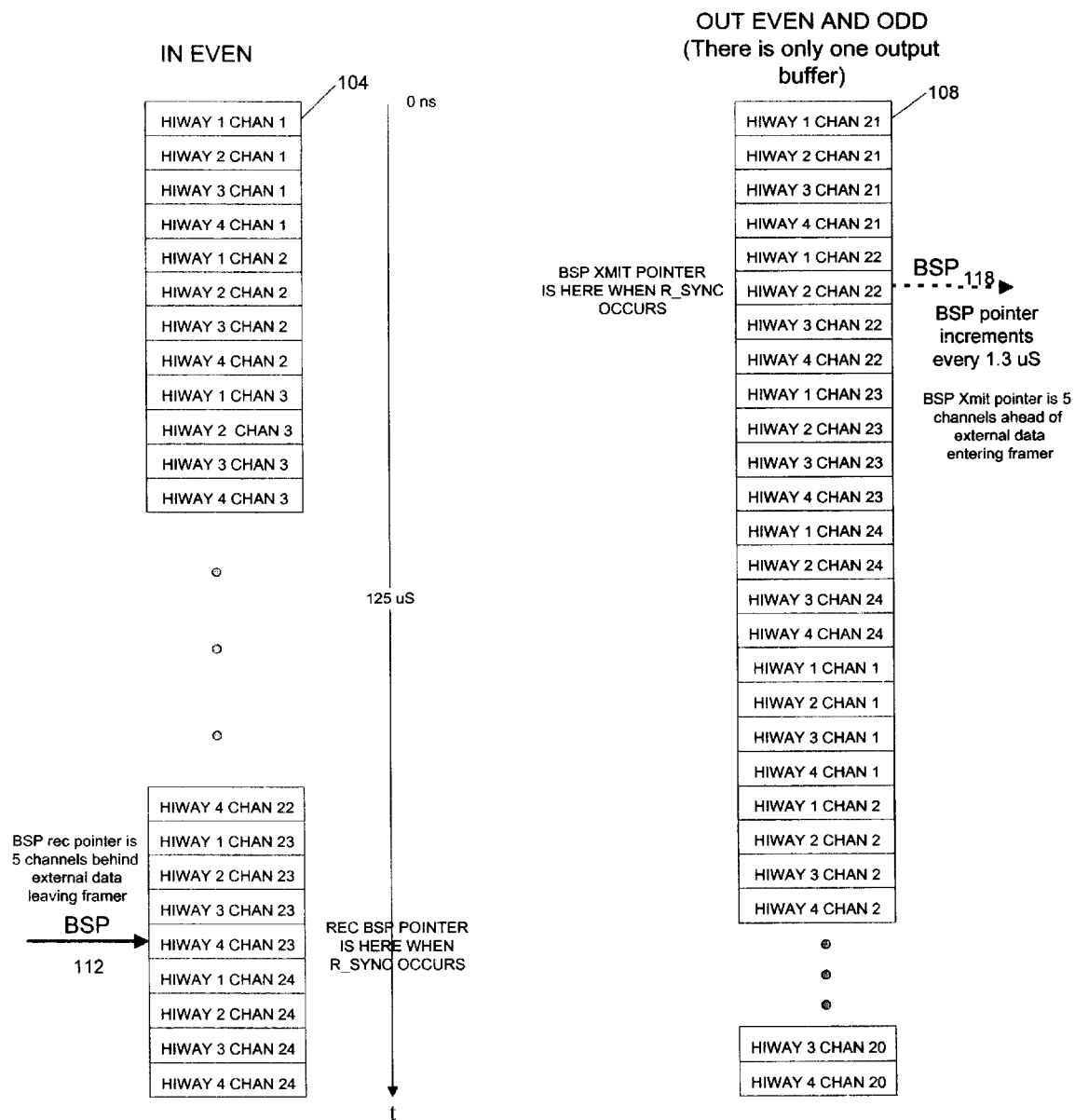
FIG. 16 is a diagram of the location of the BSP pointers at R_SYNC, in the processor of FIG. 9.

FIG. 16 is a snap shot of the location of the receive pointer 112 and the transmit pointer 118 at the instant R_SYNC 180 occurs. Note that the receive pointer 112 is five channels behind Highway 1/Channel 1. This is because data shifting through the multiplex function and entering the DSP 24 creates a five channel delay.

Figure 17:
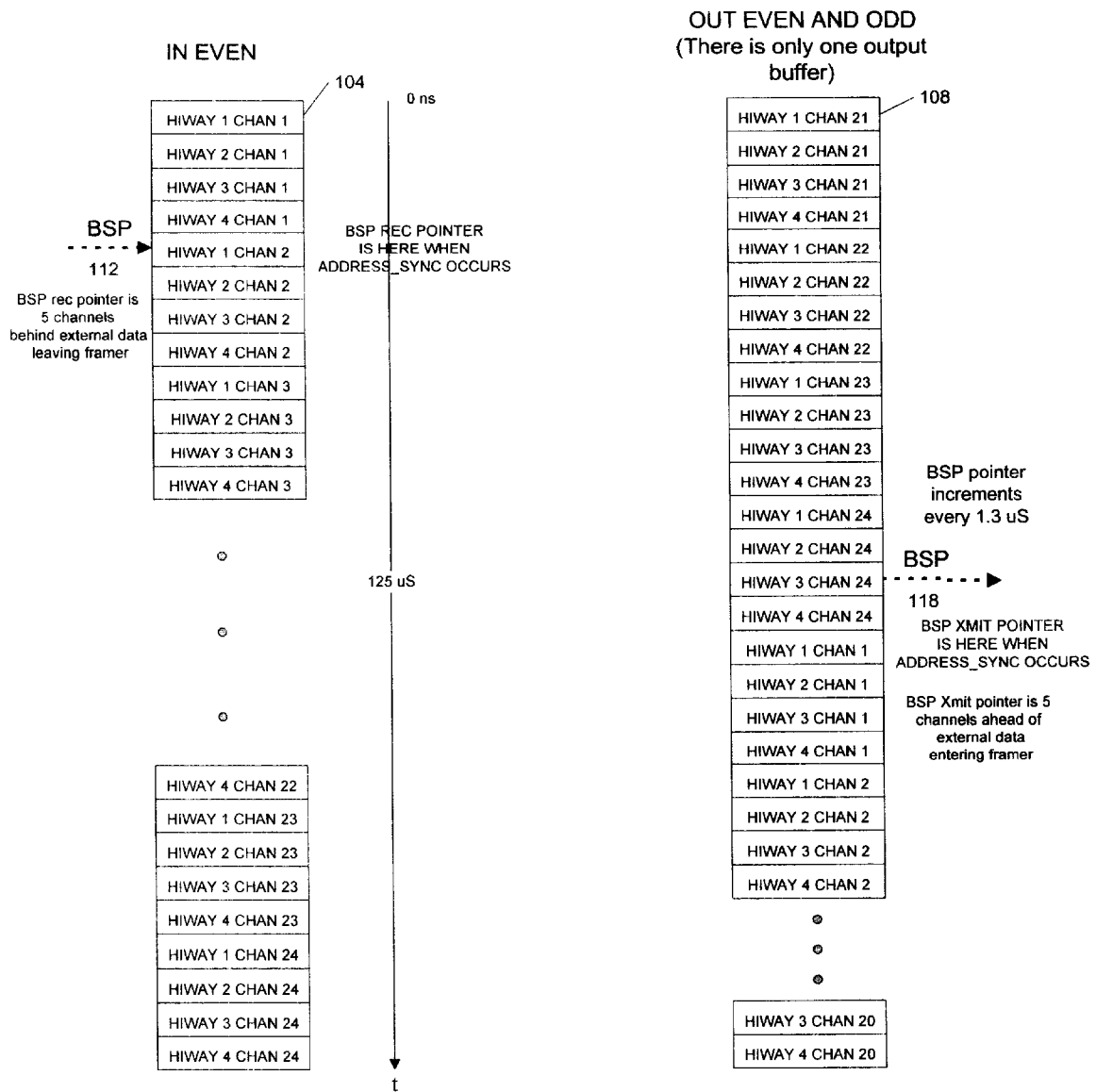
FIG. 17 is a diagram of the location of the BSP pointers at ADDRESS_SYNC, in the processor of FIG. 9.

FIG. 17 is a snap shot of where the receive pointer 112 and the transmit pointer 118 are located at the instant ADDRESS_SYNC 182 occurs. The timing of ADDRESS_SYNC 182 is strategically located so that there is ample time after the context switch for the program control unit to poll ADDRESS_SYNC 182. However, the time spent polling ADDRESS_SYNC 182 is minimized to keep the system frame delay as brief as possible. In order to do this, Highway 1/Channel 1 is deliberately placed two channels ahead of the transmit pointer 118 to give the program control unit enough time to start executing the TSI process, which updates Highway 1/Channel 1 first.

Figure 18:
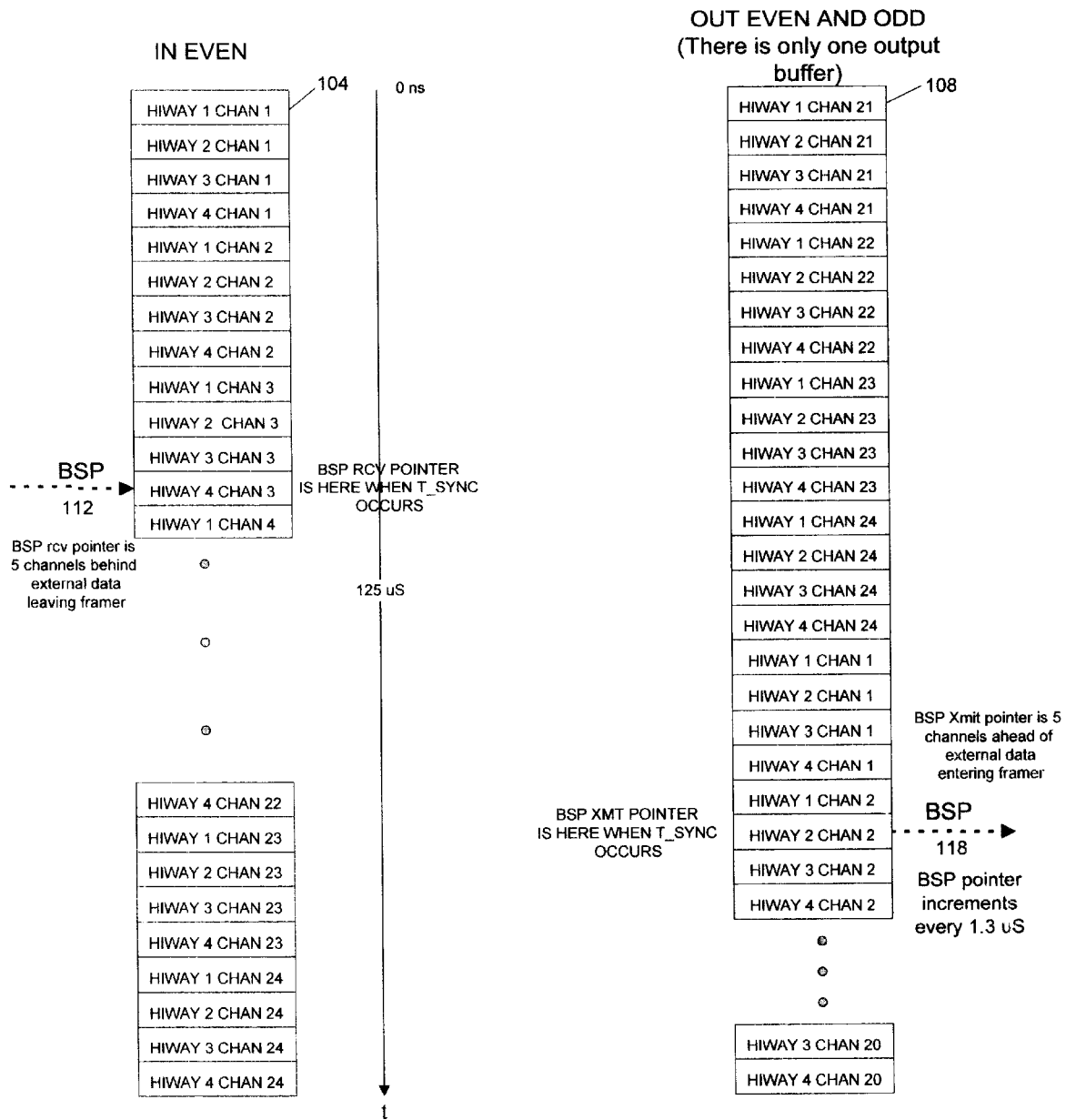
FIG. 18 is a diagram of the location of the BSP pointers at T_SYNC, in the processor of FIG. 9.

FIG. 18 is a snap shot of the location of the receive and transmit pointers 112 and 118 when T_SYNC occurs. Note that the transmit pointer 118 is five channels ahead of Highway 1/Channel 1. This is because there is a five channel delay for the data to leave the DSP 24 and shift through the demultiplexing function. Note also that the transmit pointer 118 in the output buffer 108 is always ten channels ahead of the corresponding position of the receive pointer 112 in the odd or even input buffer.

Advantages

First of all, it can be appreciated that the TSI technique of the present invention is completely non-blocking, meaning that any input channel can be switched or connected to any output channel. This is clearly a desirable feature in telecommunications equipment, and one not always provided in hardware implementations.

More importantly, a system providing TSI with increased functionality including dramatically reduced frame delay and Automatic Protection Switching has been implemented in software (in a processor) rather than in hardware. The impacts of a software-based implementation are many, including greatly reduced physical size for the system as well as reduced cost. Of course, flexibility, adaptability, and scalability are all greatly increased with such a software-based implementation as opposed to a hardware implementation.

The availability of the system of the present invention will allow many more users to have access to T-1 lines, especially in business applications. With the exploding nature of the telecommunications industry, such an advance is sure to provide other advantages not mentioned or not yet foreseen.

The foregoing description is considered as illustrative only of the principles of the invention. Furthermore, since numerous modifications and changes will readily occur to those skilled in the art, it is not desired to limit the invention to the exact construction and process shown as described above. For example, the TSI technique of the present invention could be implemented in another type of processor than a DSP. In addition, although two DSPs are used in the disclosed embodiment, the technique of the present invention could also be implemented in a single DSP. Also, the Mux/Demux technique could be implemented in hardware other than an FPGA. Most importantly, even though the technique of the present invention has been disclosed with a certain number of telecommunication or PCM highways, this technique is equally applicable to handle many more highways. Thus, the technique is not limited by the data rate or the number of highways or channels, and the hardware, processor and software can be scaled up or down to accommodate as many or as few highways as desired and as is possible with then available technology in processors and so forth. Accordingly, all suitable modifications and equivalents may be resorted to falling within the scope of the invention as defined by the claims which follow.

What is claimed is:

1. A processor-based apparatus for performing a time slot interchange completely therewithin, comprising:

a processor having an input serial port, an output serial port, a memory, and a program control unit to control the processor based on stored instructions and external commands;

wherein the memory of the processor is configured to create two input buffers, an even input buffer and an odd input buffer, into which an input serial data stream received through the input serial port can be buffered to allow one of the input buffers to be emptied while the other of the input buffers is being filled;

wherein the memory of the processor is also utilized to create an output buffer from which an output serial data stream can be generated and supplied out of the processor through the output serial data port;

wherein the program control unit of the processor controls the memory to transfer data between the input buffers and the output buffer in fashion which remaps the data in the input buffer into data in the output buffer to perform a time slot interchange, wherein the program control unit of the processor includes two connection arrays, a connection array for the even input buffer and a connection array for the odd input buffer, wherein the connection arrays have connection data stored therewithin that the program control unit utilizes to remap the data from given slots in the input buffers into given slots in the output buffer, wherein the data is read in one of sequential or non-sequential fashion from the input buffers and the data is written in the other of sequential or non-sequential fashion to the output buffer.

2. A processor-based apparatus as defined in claim 1, wherein the apparatus is used to link multiple digital telecommunication highways which each transport channels of digital data, which channels can include voice channels, data channels, or video channels, or any combination thereof, the apparatus further including:

external circuitry which multiplexes the digital data from each of the telecommunication highways into the input serial data stream, the input serial data stream being of a higher rate than the serial data streams of the telecommunication highways, and which circuitry also demultiplexes the data from the output serial data stream into serial data streams for each of the telecommunication highways;

wherein the output serial data stream is of a higher rate than the serial data streams of the telecommunication highways.

3. An apparatus as defined in claim 1, wherein the data is read in non-sequential fashion from the input buffers and the data is written in sequential fashion to the output buffer.

4. An apparatus as defined in claim 3, wherein the processor includes an output pointer associated with the output serial port that sequentially writes data from the output buffer to the output serial port.

5. An apparatus as defined in claim 4, wherein the output pointer follows the sequential writing of data to the output buffer by at least a predetermined number of slots in the output buffer.

6. An apparatus as defined in claim 5, wherein the predetermined number of slots is two.

7. An apparatus as defined in claim 1, wherein the data is read in sequential fashion from the input buffers and the data is written in non-sequential fashion to the output buffer.

8. An apparatus as defined in claim 1, wherein the time slot interchange is performed on time slots within multiple digital telecommunication highways, and wherein the time slot in the output buffer corresponding to the first time slot in a given telecommunication highway is written to before the other time slots in the given telecommunication highway.

9. An apparatus as defined in claim 1, wherein the output buffer is a circular buffer.

10. An apparatus as defined in claim 1, wherein the operation of writing data to the output buffer temporarily halts after each of the slots in the output buffer is written to and commences again after one of the input buffers is completely filled.

11. An apparatus as defined in claim 1, wherein the even and odd input buffers occupy one contiguous section of the memory of the processor.

12. An apparatus as defined in claim 1, wherein there is an offset associated with the location of the input buffers in the memory of the processor and the offset is added to the connection data before it is stored in the connection arrays.

13. An apparatus as defined in claim 1, wherein the program control unit accesses the connection data in the connection arrays sequentially.

14. An apparatus as defined in claim 1, wherein the program control unit follows the following program control construct in remapping data from given slots in the input buffers to given slots in the output buffer:

FOR (i=1 to N, in steps of 1)
   OUT(i)=IN(CONNECT(i));

where N=the number of slots in the input buffer and in the output buffer,

OUT(x)=the contents of slot x of the output buffer;

IN(x)=the contents of slot x of the input buffer for the data being remapped; and CONNECT(x)=the contents of slot x of the connection array corresponding to the input buffer for the data being remapped.

\* \* \* \* \*